(12) United States Patent
Rusert et al.

(10) Patent No.: US 10,158,850 B2
(45) Date of Patent: Dec. 18, 2018

(54) DEPTH MAP ENCODING AND DECODING

(75) Inventors: Thomas Rusert, Kista (SE); Zhuangfei Wu, Danderyd (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1058 days.

(21) Appl. No.: 14/239,694

(22) PCT Filed: Aug. 15, 2012

(86) PCT No.: PCT/SE2012/050874
§ 371 (c)(1),
(2), (4) Date: Feb. 19, 2014

(87) PCT Pub. No.: WO2013/028121
PCT Pub. Date: Feb. 28, 2013

(65) Prior Publication Data
US 2014/0205015 A1 Jul. 24, 2014

Related U.S. Application Data

(60) Provisional application No. 61/527,303, filed on Aug. 25, 2011.

(51) Int. Cl.
*H04N 19/597* (2014.01)
*H04N 19/66* (2014.01)
(Continued)

(52) U.S. Cl.
CPC ..... *H04N 19/00769* (2013.01); *H04N 19/117* (2014.11); *H04N 19/172* (2014.11);
(Continued)

(58) Field of Classification Search
CPC ....... H04N 19/00769; H04N 19/00575; H04N 19/0066; H04N 19/00696; H04N 19/00533
See application file for complete search history.

(56) References Cited

U.S. PATENT DOCUMENTS

| 8,711,931 B2 * | 4/2014 | Tanaka | H04N 9/8042 |
| | | | 375/240.12 |
| 2004/0062307 A1 * | 4/2004 | Hallapuro | H04N 19/139 |
| | | | 375/240.13 |

(Continued)

FOREIGN PATENT DOCUMENTS

| EP | 2023639 A1 * | 2/2009 | ........... H04N 19/105 |
| EP | 2387243 A2 * | 11/2011 | ......... H04N 13/0003 |

(Continued)

OTHER PUBLICATIONS

Hannuksela, "Test model under consideration for AVC-based 3D video coding (3DV-ATM)", International Organisation for Standardisation, ISO/IEC JTC1/SC29/WG11, Coding of Moving Pictures and Audio. Geneva, Switzerland, Dec. 2011, 1-15.

(Continued)

*Primary Examiner* — Shawn S An
(74) *Attorney, Agent, or Firm* — Murphy, Bilak & Homiller, PLLC

(57) ABSTRACT

The embodiments use prediction weights in connection with predictive encoding and decoding of a depth map in the form of a frame (10) with pixels (11) having pixel values representing distances between a camera (40) and objects. The prediction weight is calculated based on depth clipping plane parameter values associated with the frame (10) and with a reference frame (20, 30) based on which pixels of the frame (10) are encoded and decoded. Using depth clipping plane parameter values when calculating prediction weights, improves coding efficiency of depth map coding and decoding.

25 Claims, 16 Drawing Sheets

(51) Int. Cl.

| | | |
|---|---|---|
| *H04N 19/56* | (2014.01) | |
| *H04N 19/52* | (2014.01) | |
| *H04N 19/503* | (2014.01) | |
| *H04N 19/176* | (2014.01) | |
| *H04N 19/172* | (2014.01) | |
| *H04N 19/46* | (2014.01) | |
| *H04N 19/117* | (2014.01) | |
| *H04N 19/182* | (2014.01) | |
| *H04N 19/44* | (2014.01) | |
| *H04N 19/523* | (2014.01) | |
| *H04N 19/573* | (2014.01) | |

(52) U.S. Cl.
CPC ......... *H04N 19/176* (2014.11); *H04N 19/182* (2014.11); *H04N 19/44* (2014.11); *H04N 19/46* (2014.11); *H04N 19/503* (2014.11); *H04N 19/52* (2014.11); *H04N 19/523* (2014.11); *H04N 19/56* (2014.11); *H04N 19/573* (2014.11); *H04N 19/597* (2014.11); *H04N 19/66* (2014.11)

(56) References Cited

U.S. PATENT DOCUMENTS

| | | | |
|---|---|---|---|
| 2006/0008010 A1* | 1/2006 | Soh ...................... | H04N 19/197 375/240.24 |
| 2009/0129465 A1 | 5/2009 | Lai et al. | |
| 2009/0148058 A1* | 6/2009 | Dane ...................... | H04N 5/145 382/251 |
| 2012/0328018 A1* | 12/2012 | Lin ...................... | H04N 19/105 375/240.16 |
| 2014/0002596 A1* | 1/2014 | Antonio ............... | H04N 19/597 348/43 |

FOREIGN PATENT DOCUMENTS

| | | |
|---|---|---|
| JP | 2009522932 A | 6/2009 |
| WO | 2006033953 A1 | 3/2006 |
| WO | 2008010929 A2 | 1/2008 |
| WO | 2009017301 A1 | 2/2009 |
| WO | 2010079921 A2 | 7/2010 |
| WO | 2010093350 A1 | 8/2010 |
| WO | 2010126608 A2 | 11/2010 |

OTHER PUBLICATIONS

Schwarz, et al., "Test Model under Consideration for HEVC based 3D video coding", International Organisation for Standardisation, Coding of Moving Pictures and Audio, ISO/IEC JTC1/SC29/WG11 MPEG2011/N12559. San Jose, CA, USA, Feb. 2012, 1-44.

Unknown, Author, "Information Technology—Coding of Audio-Visual Objects—Part 10: Advanced Video Coding", International Standard. ISO/IEC 14496-10, 2010, 1-704.

Unknown, Author. "Report on Experimental Framework for JD Video Coding." International Organisation for Standardisation. Coding of Moving Pictures and Audio. ISO/IEC JTC1/SC29/WG11. MPEG2010/N11631. Guangzhou, China. Oct. 2010. 1-10.

Kim et al. "Depth Map Distortion Analysis for View Rendering and Depth Coding." IEEE 2009. ICIP. pp. 721-724.

Palomo. "Interactive Image-Based Rendering for Virtual View Synthesis From Depth Images." Rio de Janeiro. Jul. 2009. 1-52.

Suzuki et al. "WD on MVC extensions for inclusion of depth maps." International Organisation for Standardisation. Coding of Moving Pictures and Associated Audio Information. ISO/IEC/JTC1/SC29/WG11/N12351. Dec. 2011. 1-14.

Xiu et al. "An Improved Depth Map Estimation Algorithm for View Synthesis and Multiview Video Coding." Visual Communications and Image Processing 2010. SPIE vol. 7744, 774429. 1-9.

\* cited by examiner

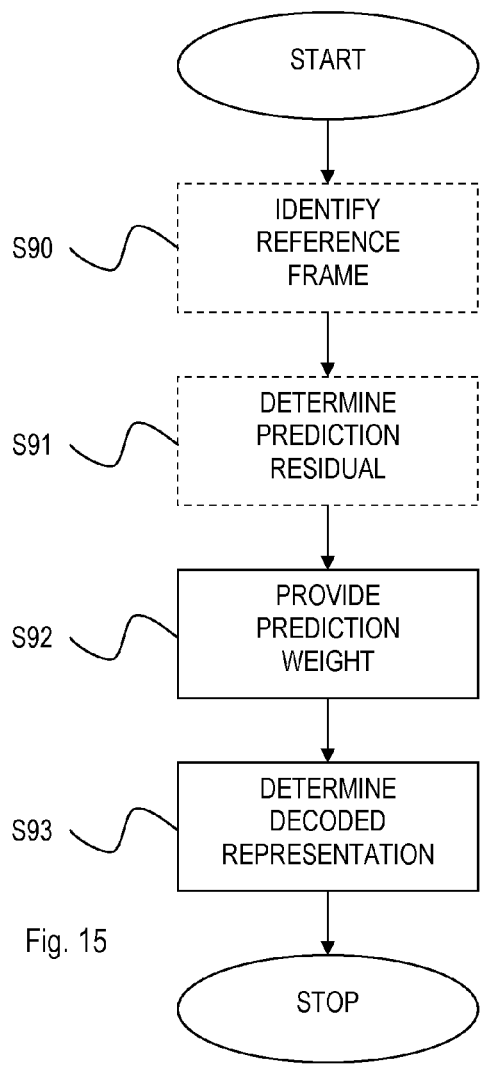
Fig. 15
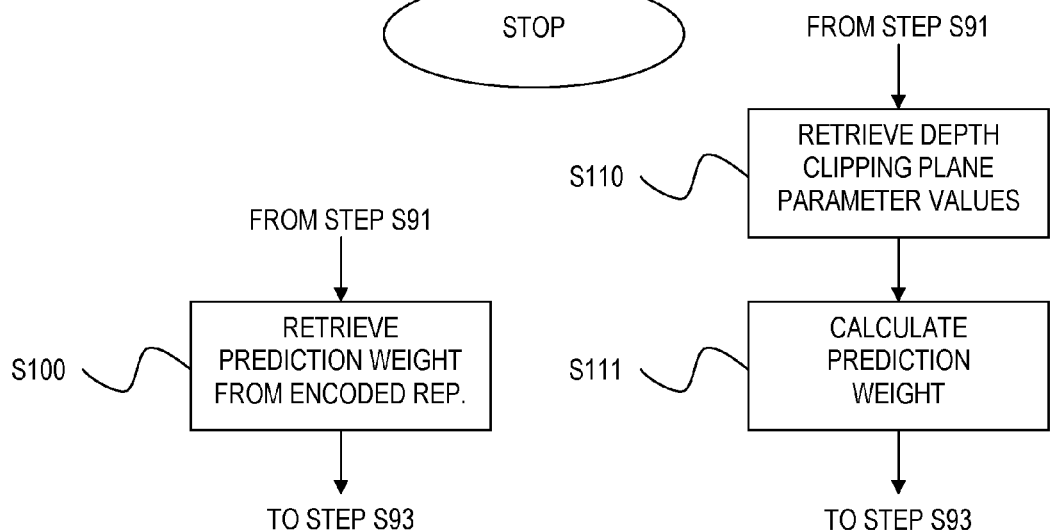
Fig. 16
Fig. 17

DEPTH MAP ENCODING AND DECODING

TECHNICAL FIELD

The present embodiments generally relate to processing of depth maps, and in particular to predictive encoding and decoding of such depth maps.

BACKGROUND

H.264, also referred to as Moving Picture Experts Group-4 Advanced Video Coding (MPEG-4 AVC), is the state of the art video coding standard. It is a hybrid codec which takes advantages of eliminating redundancy between frames and within one frame. The output of the encoding process is Video Coding Layer (VCL) data which is further encapsulated into Network Abstraction Layer (NAL) units prior to transmission or storage. It is a hybrid video coding standard that uses a number of compression technologies that give good compression efficiency.

H.264 is block-based, i.e. a video frame is processed in units of MacroBlocks (MB) which is a 16×16 block of pixels that may be further divided into sub-macroblocks. In order to minimize the amount of data to be coded, a technology called Motion Compensation (MC) is applied on each non-intra block which uses previously reconstructed pixel values in neighboring frames to predict the pixel values of the current block at its best effort. To get a prediction for the current block, reference to an area that is similar to current block in the reference frame is signaled in the bitstream. Final reconstruction can be made by adding the predicted pixel value together with a residual pixel value. In order to find a best match of current coding block in the reference frame, motion search is usually done at the encoder side. It tries to find lowest Sum of Squared Differences (SSD) of Sum of Absolute Differences (SAD) between the current block and possible reference blocks. The outcome of the motion search is a reference frame index signaling which reference frame it refers to and an offset vector called Motion Vector (MV) pointing to the reference area.

There are three types of slices in H.264: I, P and B slices. An I slice contains only data that is coded on its own without referencing any other frames. A P slice contains uni-directional predicted MBs that are referencing respective single areas in a respective other frame. A B slice may contain blocks that refer to reconstructed pixels in I or P slices, or other B slices. Besides that, a B slice may also contain bi-directional predicted MBs where the prediction consists of multiple components that are obtained from different reference areas. Typically the prediction is made by averaging a forward reference and a backward reference. Weighted prediction is a special type of bi prediction where the reference components do not have equal weights. It can provide significant benefits in special cases, such as fade-in scene.

In today's 3D video representations, one of the commonly used formats is "texture+depth". The texture video represents the actual video texture while the depth map contains all the depth information related to the texture representation. Using view synthesis algorithms, arbitrary number of views can be synthesized from a texture+depth format which can be used in either stereo or autostereoscopic applications. A depth map is usually a grey scale image where the luminance values indicate the distances between the camera and the objects. It can be used together with texture video to create another view. One commonly used type of depth map has the property that the closer the object to the camera, the higher the luminance value is.

Restricted by the bit depth, a depth map only has limited value range. For a bit depth of 8 bits, there can be maximum 256 steps of luminance values. These are far less than enough to represent all the range of real scenes since they can range from clouds at nearly infinity or an ant in front of camera lens. If one considers luminance value 0 as infinity and luminance value 255 as the closest scene the camera can capture, the quantization error will be too big whereas the precision is lost. Fortunately, in real scenarios, a video does not usually focus on both a book close by and a mountain far away. Therefore one can properly assign the limited 256 steps to a local range of interest according to the properties of the scene. To such depth ranges, two parameters are defined. $Z_{near}$ indicates the closest object that can be resolved by a depth value. It typically has luminance value of 255. All the scenes that have a distance between 0 and $Z_{near}$ from the camera are treated as having the depth $Z_{near}$ thus have 255 as their luminance number. Similarly, $Z_{far}$ indicates the farthest object that can be resolved by depth value. It has luminance value 0. All the scenes that have a distance between $Z_{far}$ and infinity from the camera are treated as having the depth value $Zf_{ar}$ thus have 0 as luminance value. The depths z in-between $Z_{near}$ and $Z_{far}$ are given by equation 1 below wherein d represents luminance:

$$z = \frac{1}{\frac{d}{255}\left(\frac{1}{z_{near}} - \frac{1}{z_{far}}\right) + \frac{1}{z_{far}}} \quad (1)$$

Depth maps are required at the 3D client side to render 3D effects so they are transmitted in the 3D bitstream. To save transmission bandwidth, it is desirable to compress it as much as possible. As of today, there is no dedicated video codec for coding depth map. Normal "texture" video codecs like H.264 are typically used.

Depth dipping plane parameters, i.e. $Z_{near}$ and $Z_{far}$, are also transmitted together with depth map as key parameters to define the luminance-depth transform formula (equation 1) presented above. The depth clipping planes can be changing frame by frame based on the scene the camera is shooting. For instance, when a camera is zooming in, it is likely both $Z_{near}$ and $Z_{far}$ are decreased to suit better the content. Sometimes even for a static scene, $Z_{near}$ and $Z_{far}$ are modified in order to make special effect the content producer wants to create.

Encoding and decoding of depth maps and in particular predictive encoding and decoding of depth maps can run into problems especially when there are significant changes in the depth clipping plane parameter values between a current frame to be encoded or decoded and reference frames.

SUMMARY

It is a general objective to provide predictive encoding and decoding of depth maps.

It is a particular objective to use depth clipping plane parameter values in connection with predictive encoding and decoding of depth maps.

These and other objectives are met by embodiments disclosed herein.

An aspect of the embodiments relates to a method of predictive encoding of a depth map in the form of a frame of multiple pixels, where each pixel has a respective pixel value representing a respective distance between a camera and a respective object. The method comprises providing at least a first depth clipping plane parameter value associated with the frame and at least a first depth clipping plane parameter value associated with a reference frame. A prediction weight is calculated based on the at least first depth clipping plane parameter value associated with the frame and the at least first depth clipping plane parameter value associated with the reference frame and is used to calculate a prediction residual for the frame. This prediction residual is calculated based on at least one pixel value of the frame and at least one pixel value of the reference frame weighted by the prediction weight. An encoded representation of the depth map comprises an encoded representation of the prediction residual.

A related aspect of the embodiments defines an encoder for predictive encoding of a depth map in the form of a frame of multiple pixels. The encoder comprises a value provider configured to provide at least a first depth clipping plane parameter value associated with the frame and at least a first depth clipping plane parameter value associated with a reference frame. A weight calculator of the encoder is configured to calculate a prediction weight based on the at least first depth clipping plane parameter values. The encoder also comprises a residual calculator configured to calculate a prediction residual for the frame based on at least one pixel value of the frame and at least one pixel value of the reference frame weighted by the prediction weight. An encoded representation of the depth map comprises an encoded representation of the prediction residual.

Another related aspect of the embodiments defines an encoder comprising an input section configured to receive a depth map in the form of a frame of multiple pixels. The encoder comprises a processor configured to process code means of a computer program stored in a memory. The code means causes, when run on the processor, the processor to provide at least a first depth clipping plane parameter value associated with the frame and at least first depth clipping plane parameter value associated with a reference frame. The code means further causes the processor to calculate a prediction weight based on the at least a first depth clipping plane parameter values of the frame and the reference frame and to calculate a prediction residual for the frame based on at least one pixel value of the frame and at least one pixel value of the reference frame weighted by the prediction weight. The encoder also comprises an output section configured to output an encoded representation of the depth map comprising an encoded representation of the prediction residual.

Another aspect of the embodiments relates to a method of predictive decoding of an encoded representation of a depth map in the form of a frame of multiple pixels. Each pixel of these multiple pixels has a respective pixel value representing a respective distance between a camera and a respective object. The method comprises providing, based on the encoded representation of the depth map, a prediction weight that is calculated based on at least a first depth clipping plane parameter value associated with the frame and at least a first depth clipping plane parameter value associated with a reference frame. A decoded representation of the depth map is determined based on a prediction residual for the frame and at least one pixel value of the reference frame weighted by the prediction weight.

A related aspect of the embodiments defines a decoder for predictive decoding of an encoded representation of a depth map in the form of a frame of multiple pixels. The decoder comprises a weight provider configured to provide a prediction weight based on the encoded representation of the depth map. The prediction weight is calculated based on at least a first depth map clipping plane parameter value associated with the frame and at least a first depth map clipping plane parameter value associated with a reference frame. A representation determiner of the decoder is configured to determine a decoded representation of the depth map based on a prediction residual for the frame and at least one pixel value of the reference frame weighted by the prediction weight.

Another related aspect of the embodiments defines a decoder comprising an input section configured to receive an encoded representation of a depth map in the form of a frame of multiple pixels. A processor of the decoder is configured to process code means of a computer program stored in a memory. The code means causes, when run on the processor, the processor to provide a prediction weight based on the encoded representation of the depth map. The prediction weight is calculated based on at least a first depth clipping plane parameter value associated with the frame and at least a first depth clipping plane parameter value associated with a reference frame. The code means also causes the processor to determine a decoded representation of the depth map based on a prediction residual for the frame and at least one pixel value of the reference frame weighted by the prediction weight. The decoder further comprises an output section configured to output the decoded representation of the depth map.

Performing predictive encoding and decoding of depth maps based on depth clipping plane parameter values, and in particular calculating prediction weights based on such depth clipping plane parameter values, improve the coding efficiency for depth map encoding and decoding.

BRIEF DESCRIPTION OF THE DRAWINGS

The invention, together with further objects and advantages thereof, may best be understood by making reference to the following description taken together with the accompanying drawings, in which:

FIG. 15 is a flow diagram of a method of predictive decoding of an encoded representation of a depth map according to an embodiment;

FIG. 16 is a flow diagram illustrating an embodiment of the weight providing step in FIG. 15;

FIG. 17 is a flow diagram illustrating another embodiment of the weight providing step in FIG. 15;

DETAILED DESCRIPTION

Throughout the drawings, the same reference numbers are used for similar or corresponding elements.

The present embodiments generally relate to processing of depth maps, and in particular to predictive encoding and decoding of such depth maps.

In a general aspect of the embodiments the predictive encoding and decoding of depth maps is performed at least partly based on information of depth clipping parameter values associated with a depth map in the form of a current frame and associated with a reference frame used as encoding and decoding reference for the current frame. In more detail, prediction weights used in the predictive encoding and decoding are determined based on such depth clipping plane parameters. As a result of such depth dipping plane based weighting the residual signal can be minimized and thus the coding efficiency is maximized. Hence, by considering information about how a scene is changed when coding and decoding depth maps, e.g. using weighted prediction, one can get coding efficiency improvements.

Figure 1:
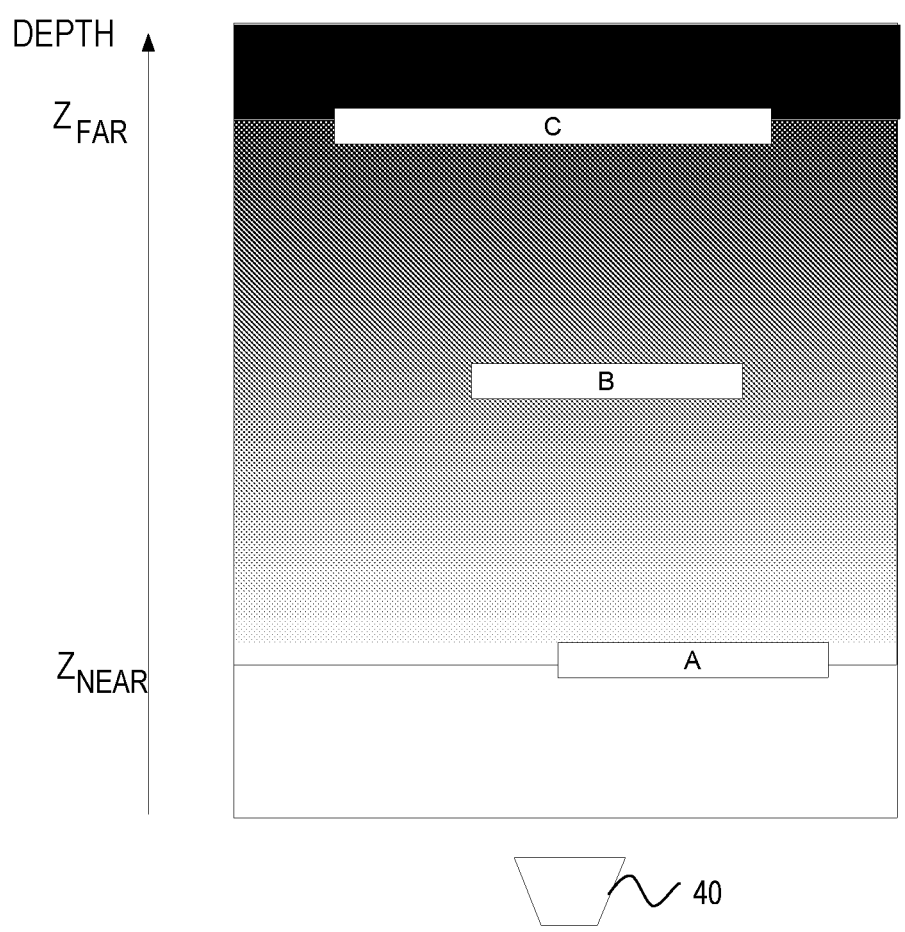
FIG. 1 illustrates an example of setting $Z_{near}$ and $Z_{far}$ in a scene with three objects A, B and C.
Figure 2:
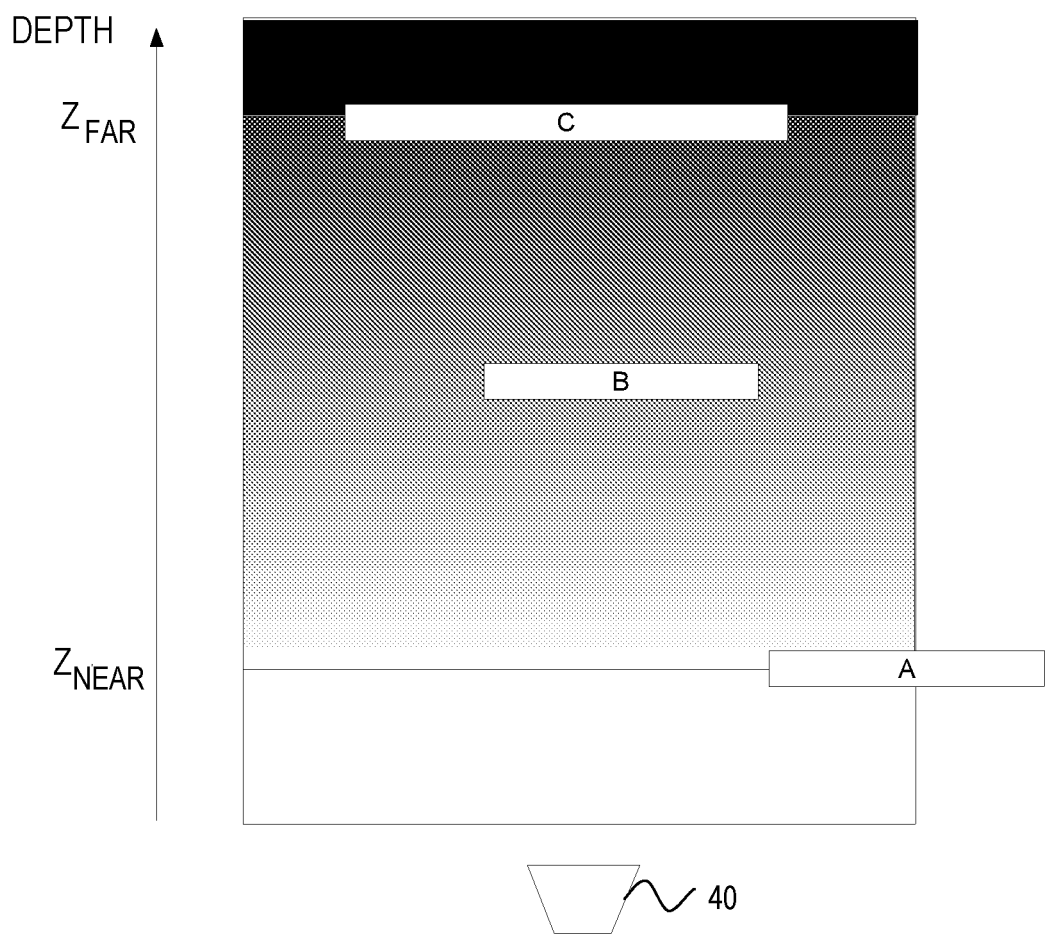
FIG. 2 illustrates the scene in FIG. 1 but with the object A moving horizontally relative to the camera.
Figure 3:
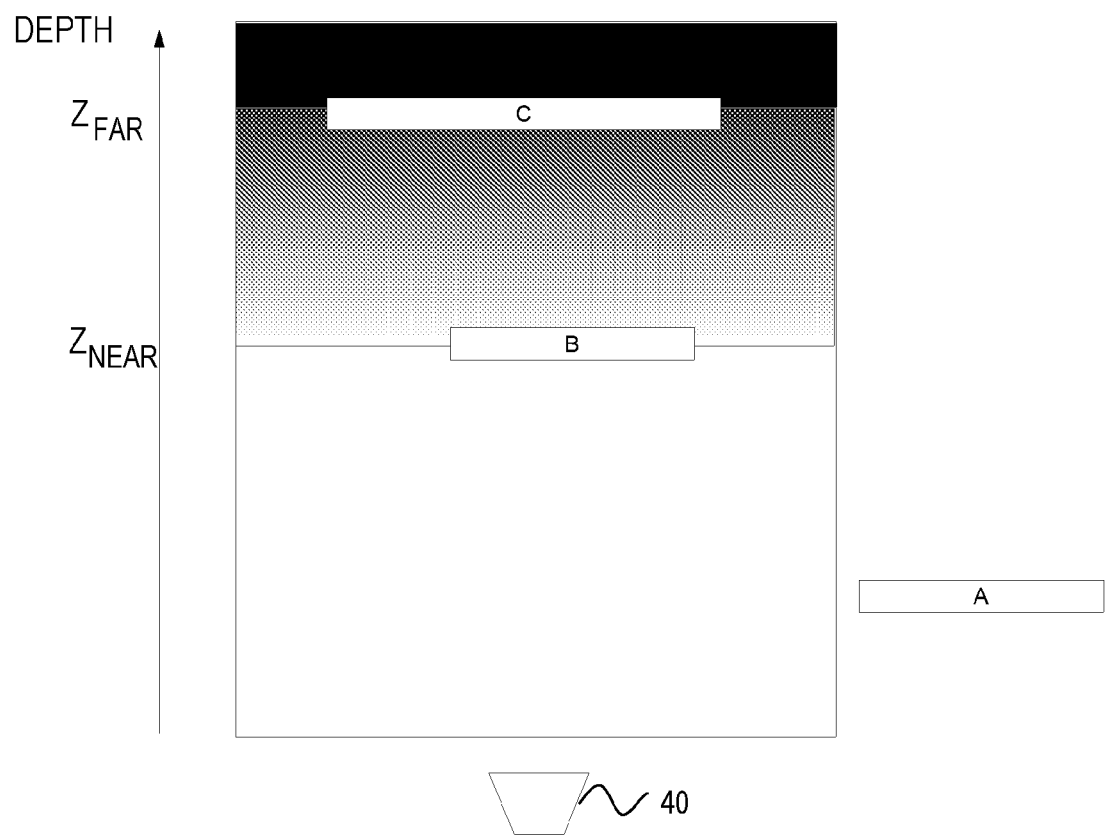
FIG. 3 illustrates the scene in FIG. 1 but with the object A moving out of the scene.

The concept of how depth clipping planes relate to depth maps will first be analyzed below with reference to FIGS. 1 to 5. In FIGS. 1 to 3 a so-called precise setting (PS) of depth clipping plane parameter values have been used. Such a process could determine the depth clipping plane parameter values according to various embodiments. In an embodiment the depth in the scene is directly measured, e.g. using time-of-flight cameras. This provides knowledge of the minimum and maximum depth in a depth map and the depth dipping plane parameter values $Z_{near}$ and $Z_{far}$ can be set accordingly. In another embodiment, the depth is estimated based on e.g. a stereo pair and by providing camera parameters. In such a case the depths can be calculated from the disparity and $Z_{near}$ and $Z_{far}$ are set accordingly. A further embodiment is applicable in particular in connection with computer graphics animation. In such a case, the built synthetic model can be used to obtain the distances between closest and farthest object to the camera and $Z_{near}$ and $Z_{far}$ are set accordingly.

FIG. 1 illustrates an example of $Z_{near}$ and $Z_{far}$ are set in a simple scene which contains only three objects A, B and C, which are located away from a camera 40 in sequential order. $Z_{near}$ is set precisely at object A and $Z_{far}$ is set precisely at object C. The area between object A and the camera 40 is painted in white, i.e. luminance value 255 for 8-bit depth. The area between object C and infinity is painted in black, i.e. luminance value 0. The area between object A and object C is painted using gradient grey which roughly indicates the grey scale each object should look like in the depth map.

Assume in an example that objects B and C are static and A is moving horizontally. FIG. 2 illustrates the situation one frame in time after the frame shown in FIG. 1. Now half of object A has moved out of the scene. However, object A still represents the nearest scene where $Z_{near}$ is set.

In FIG. 3, object A has completely moved out of the scene so that object B becomes the object that is closest to the camera 40. Consequently, $Z_{near}$ is sharply increased according to the distance of object B from the camera 40.

Considering a typical hierarchical video coding structure where frame 0 (FIG. 1) and frame 2 (FIG. 3) are coded first, e.g. frame 0 as I frame and frame 2 as P frame. Frame 1 (FIG. 2) in between is coded afterwards, e.g. as B frame, with both frame 0 and frame 2 in its reference picture or frame list, e.g. using bidirectional prediction. The embodiments use the fact that it is possible to detect that there is a sharp increase of $Z_{near}$ from frame 1 to frame 2 and this happens prior to coding of frame 1. This knowledge can be used to get a rough idea of how the scene has changed, which enable a coding efficiency improvement as further disclosed herein.

Another way of setting the depth clipping plane parameter values is not necessarily based on simply setting the distance of the closest object as $Z_{near}$ or the farther object as $Z_{far}$. This approach analyzes the distribution of depth in a scene and carries out a more intelligent way of setting $Z_{near}$ and $Z_{far}$ by preferably only covering the dense part of the depth range so that a balance is reached between covered depth range and quantization error. This approach is denoted intelligent setting (IS) herein.

IS can cleverly adjust depth clipping planes to the location where objects are clustered to provide higher depth resolution. In some cases, manual intervention is also added to create special effects. Since objects can exist outside the range of depth clipping plane, a drastic change of $Z_{near}$ and/or $Z_{far}$ gives different interpretation of the varying depth map content compared to the PS scenario.

Figure 4:
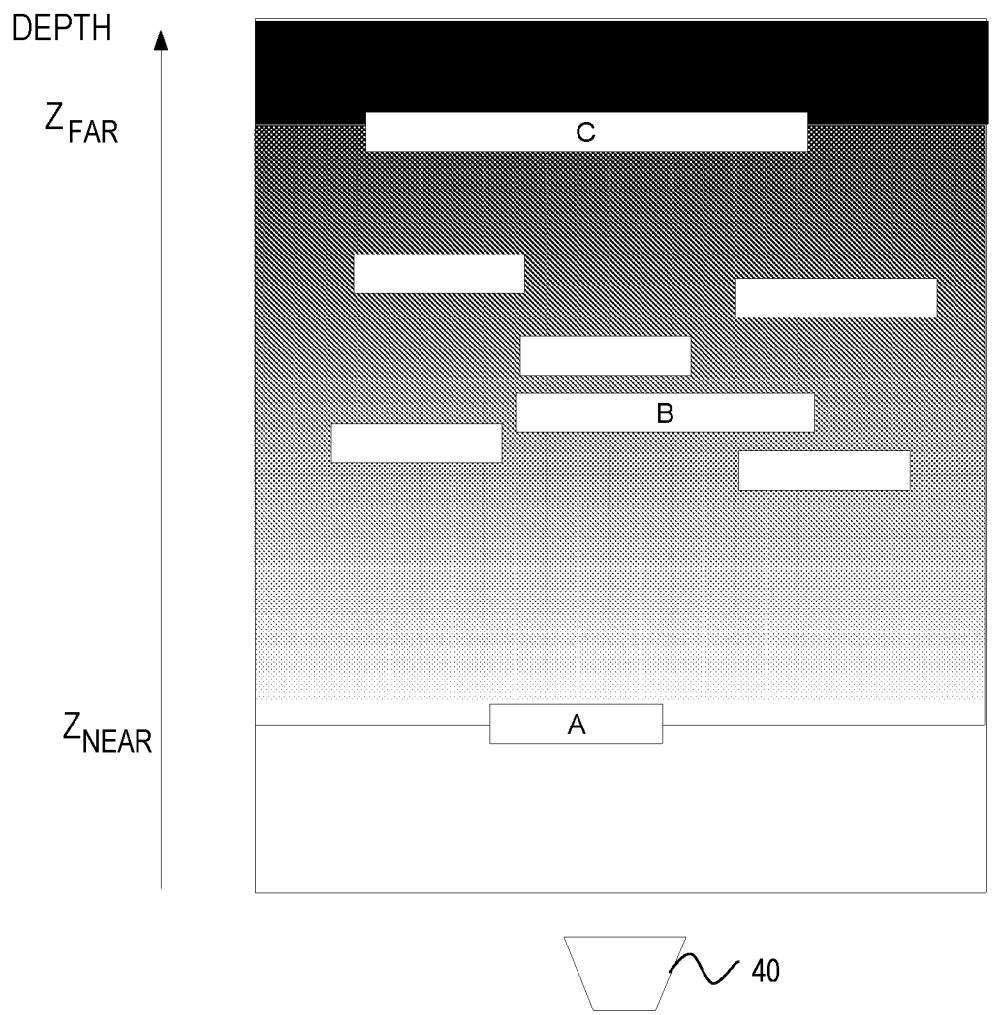
FIG. 4 illustrates an example of precise setting of $Z_{near}$ and $Z_{far}$ in a scene with multiple objects.
Figure 5:
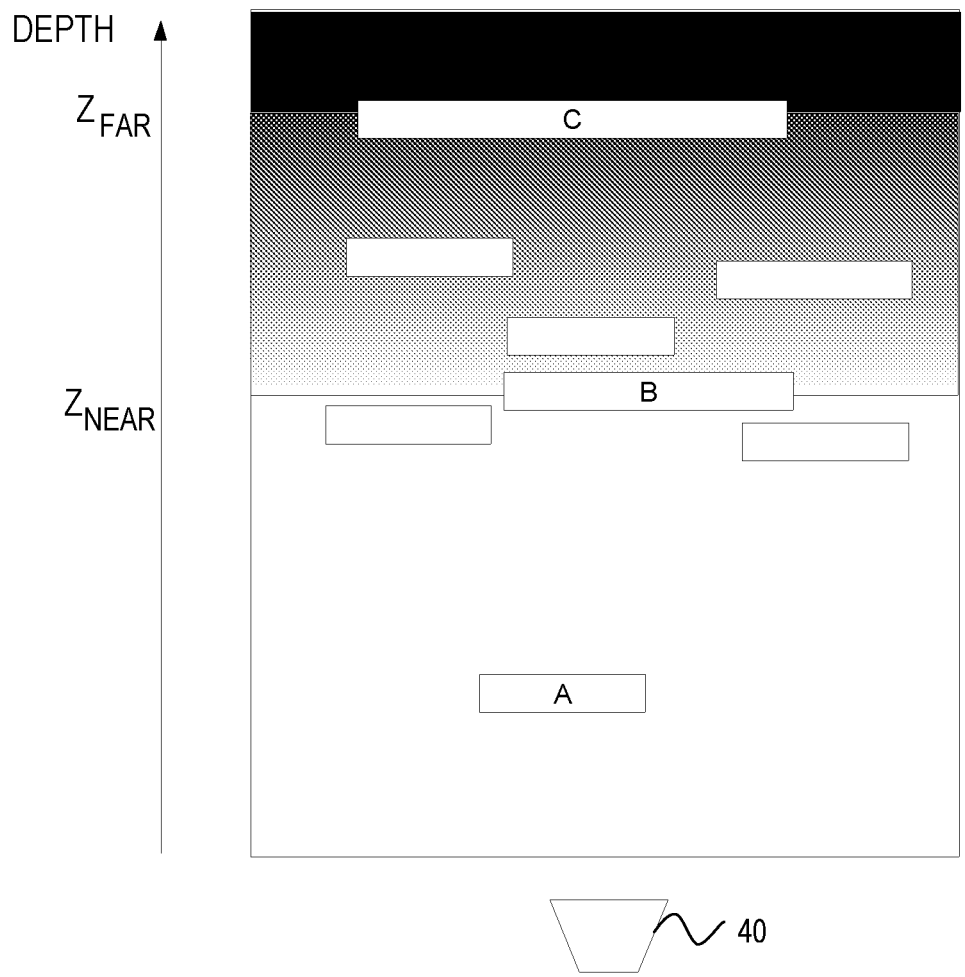
FIG. 5 illustrates an example of intelligent setting of $Z_{near}$ and $Z_{far}$ in a scene with multiple objects.

FIG. 4 is a typical way of setting depth clipping plane parameter values for a scene with PS. FIG. 5 illustrates the corresponding scene but with $Z_{near}$ and $Z_{far}$ instead set according to the IS approach. In this scene there are multiple objects with different depth values. In the frame shown in FIG. 4 all the objects are included in the range of depth clipping planes so except for object A being represented by value 255 (assuming 8-bit depth resolution) all other objects are represented by a luminance value less than 255. In the frame shown in FIG. 5, $Z_{near}$ is increased to the distance where object B is located. This could be that the IS approach, for instance, uses a self-adapting algorithm detecting that the objects are clustered at this location and that it would make sense to increase the depth resolution of that area or due to manual intervention. This type of behavior can produce the effect of global luminance change. Objects between object A and object B will all have luminance value 255. Objects between object B and object C will have higher luminance values as compared to FIG. 4. The only object that does not change is object C, which is still black. Hence, the overall effect when comparing FIG. 4 and FIG. 5 is that the global luminance value has increased.

Knowing this type of luminance changing behavior, the embodiments take advantage of weighted prediction to improve coding efficiency and get better predictions.

Figure 6:
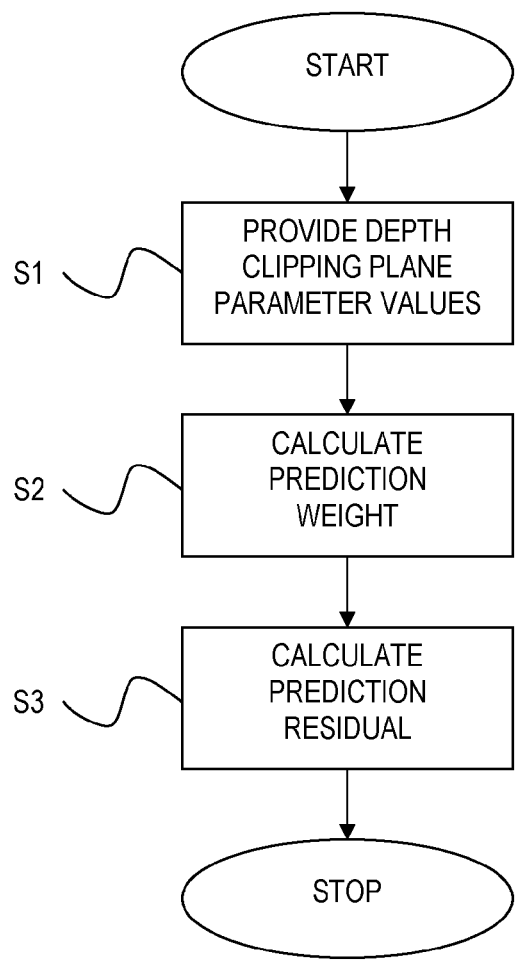
FIG. 6 is a flow diagram of a method of predictive encoding of a depth map according to an embodiment.
Figure 20:
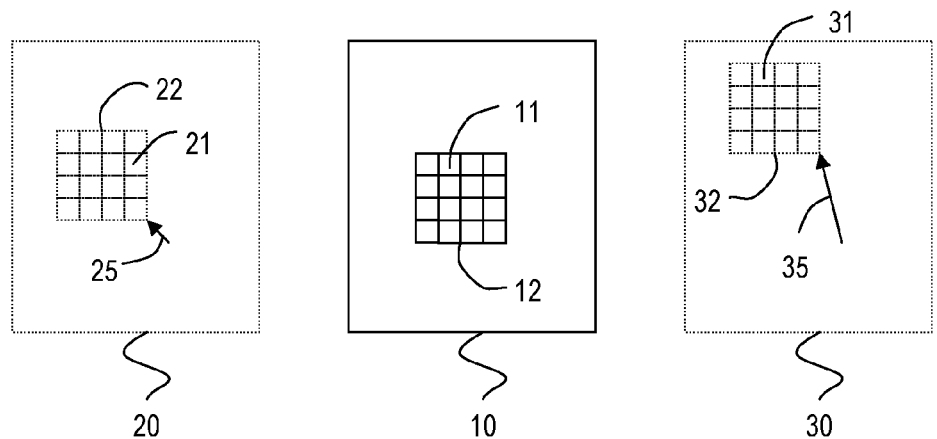
FIG. 20 schematically illustrates a stream of frames according to an embodiment.

FIG. 6 is a flow diagram illustrating, with reference also to FIG. 20, an embodiment of predictive encoding of a depth map in the form of a frame 10 of multiple pixels 11. Each pixel 11 of these multiple pixels 11 in the frame 10 has a respective pixel value representing a respective distance between a camera and a respective object. The pixel values are preferably the previously mentioned luminance values that are traditionally used to represent depths and are represented by d in equation 1 in the foregoing.

A general embodiment of the method comprises providing at least a first depth clipping plane parameter value associated with the frame 10 and at least a first depth clipping plane parameter value associated with a reference frame 20, 30 in step S1. Step S2 calculates a prediction weight based on the at least a first depth clipping plane parameter value associated with the frame 10 and the at least a first depth clipping plane parameter value associated with the reference frame 20, 30. A prediction residual for the frame 10 is calculated in step S3 based on at least one pixel value of the frame 10 and at least one pixel value of the reference frame 20, 30 weighted by the prediction weight. An encoded representation of the depth map then comprises an encoded representation of the prediction residual.

Various particular embodiments of this general embodiment will now be further described herein.

In an embodiment, the method of FIG. 6 generally states in step S1 where at least a first depth clipping parameter value associated with the current frame 10 is provided together with at least a first depth clipping parameter value associated with a reference frame 20, 30. The provided depth clipping parameter values could be the respective $Z_{near}$ value of the current frame 10 and the reference frame 20, 30 or the respective $Z_{far}$ value of the current frame 10 and the reference frame 20, 30. Thus, in these alternatives a single respective depth clipping plane parameter value is provided per frame 10, 20, 30 in step S1. In an alternative embodiment, step S1 provides both the $Z_{near}$ and $Z_{far}$ values of the current frame 10 and the $Z_{near}$ and $Z_{far}$ values of the reference frame 20, 30. In such an embodiment, two depth dipping plane parameter values are provided in step S1 for each frame 10, 20, 30.

Step S1 advantageously determines or retrieves the depth clipping plane parameter values based on the data associated with the current frame 10 and the reference frame 20, 30. As previously disclosed herein, these parameter values could be determined according to PS approach or according to the IS approach. Alternatively, the parameter values have previously been determined and are sent together with the pixel data (luminance values) of the frames 10, 20, 30.

A next step S2 calculates a prediction weight based on the at least first depth clipping plane parameter value associated with the current frame 10 and the at least first depth dipping plane parameter value associated with the reference frame 20, 30 and provided in step S1. Hence, according to the embodiments the depth dipping plane parameter values provided in step S1 for the current frame 10 and the reference frame 20, 30 are used in step S2 to calculate a suitable prediction weight for the reference frame 20, 30.

The prediction weight calculated in step S2 is then used in step S3 to calculate a prediction residual or difference from the current frame 10. This prediction residual is calculated based on at least one pixel value of the current frame 10 and at least one pixel value of the reference frame 20, 30 weighted by the prediction weight calculated in step S2. An encoded representation of the depth map, i.e. the current frame 10, preferably comprises this calculated prediction residual typically in the form of an encoded version or representation thereof, such as a variable length coded version.

The at least one pixel value of the reference frame 20, 30 is typically identified by a motion vector 25, 35, which is well known in the art. The encoded representation of the depth map then preferably comprises an encoded representation of this motion vector.

The purpose of such predictive video coding is to minimize the prediction residual signal because residual values close to zero are typically coded with fewer bits as compared to larger prediction residuals. Using a single reference frame, i.e. unidirectional prediction, the prediction residual signal can generally be written as $\Delta d_1 = d_1 - pd_1$, wherein $d_1$ indicates the signal to be predicted in the current frame (at least one pixel value of the current frame), $pd_1$ indicates the prediction signal and $\Delta d_1$ indicates the prediction residual signal (prediction residual). Assuming that the current frame is frame 1 and the reference frame is frame 0 then a prediction weight w as calculated in step S2 can be used to improve the prediction and we get $pd_1 = w \times d_0$ and $\Delta d_1 = d_1 - w \times d_0$, wherein $d_0$ indicates the reference signal in the reference frame (at least one pixel value of the reference frame).

The above presented concept can of course also be applied to bidirectional prediction. In such a case, step S1 provides at least a first depth dipping plane parameter value associated with the current frame 10, at least a first depth dipping plane parameter value associated with a first reference frame 20 and at least a first depth clipping plane parameter value associated with a second reference frame 30. Step S2 calculates a first prediction weight based on the depth clipping plane parameter values provided in step S1 for the current frame 10 and for the first reference frame 20. Step S2 preferably also calculates a second prediction weight based on the depth clipping plane parameter values provided for the current frame 10 and the second reference frame 30 in step S1. In such a case, step S3 calculates the prediction residual for the current frame 10 based on at least one pixel value of the frame 10, at least one pixel value of the first reference frame 20 weighted by the first prediction weight and at least one pixel value of the second reference frame 30 weighted by the second prediction weight.

The prediction residual signal could then, in correspondence to above, be calculated as $\Delta d_1 = d_1 - w_A \times d_0^A - w_B \times d_0^B$, wherein $w_{A/B}$ represents the first/second prediction weight and $d_0^A/d_0^B$ represents the reference signal in the first/second reference frame 20/30.

The reference frame for which at least one depth clipping plane parameter value is provided in step S1 can be identified or found according to techniques well known in the art of video coding, e.g. in a motion compensation or estimation procedure. Generally, a set of at least one, typically multiple, frames 20, 30 in the stream are identified as potential or candidate reference frames for a current frame 10. These reference frames 20, 30 could have a respective point in time preceding or even following the point of time of the current frame 10. However, they precede the current frame 10 according to the encoding/decoding order. In a typical approach, these potential reference frames 20, 30 could be selected among temporally neighboring frames in the frame stream. In the case of multiview video coding, reference frames could also be selected among frames having a same point in time as the current frame 10 but belonging to other camera views as compared to the current camera view of the current frame.

If a set of multiple candidate reference frames 20, 30 are available, step S1 preferably provides respective depth clipping plane parameter values for each such candidate reference frame 20, 30. A respective prediction weight is calculated in step S2 for each candidate reference frame 20, 30 and is used to find lowest sum of squared differences (SSD) or sum of absolute differences (SAD) between a current block 12 of pixels 11 in the current frame 10 and possible reference areas or blocks 22, 32 of pixels 21, 31 having pixel values weighted by the respective weights. The outcome of the motion search is a reference index signaling which reference frame 20, 30 it refers to and an offset vector called motion vector (MV) 25, 35 pointing to the reference area 22, 32. The prediction residual that minimized the SSD or SAD is used together with the reference index and the motion vector 25, 35 to form the encoded representation of the depth map.

In a particular embodiment, step S1 provides a near depth dipping plane parameter value ($Z_{near}$) and a far depth dipping plane parameter value ($Z_{far}$) associated with the current frame and $Z_{near}$ and $Z_{far}$ associated with the reference frame. In such a case, these four depth clipping plane parameter values are used in step S2 to calculate the prediction weight.

In a particular embodiment, the prediction weight could be calculated in step S2 based on a quotient between a difference between $Z_{far}$ and $Z_{near}$ associated with the current frame and a difference between $Z_{far}$ and $Z_{near}$ associated with the reference frame.

Herebelow various embodiments of calculating the prediction weight will be described. The present embodiments should, however, be viewed as illustrative but non-limiting examples of how to use depth dipping plane parameter values in order to calculate prediction weights in connection with depth map encoding and decoding.

In an embodiment, it is assumed that $d_0$ and $d_1$ are pixel values (luminance values) in frame 0 (reference frame) and frame 1 (current frame), respectively and that an 8-bit representation is used, i.e. $d_0$ and $d_1$ are between 0 and 255. $d_0$ and $d_1$ are connected to their respective Z value counterparts $Z_0$ and $Z_1$, i.e. the physical distance from the camera, through the equation 1 given the respective values $Z_{near,i}$ and $Z_{far,i}$ for frame i=0 and i=1, respectively. Considering changing values for $Z_{near,i}$ and $Z_{far,i}$ over time, this relationship can be used to derive an optimum prediction weight w.

For the purpose of prediction it is reasonable to assume that the reference distance $Z_0$ and the current distance value $Z_1$ are equal. This is because typically pixels belonging to a certain object in a frame are predicted from pixels from the same object in the reference frame, which in the case of object motion, may be achieved by applying motion compensation accordingly. It can also be assumed that between two adjacent frames at sufficiently high frame rate, the distance of an object from the camera has not changed much. Now assuming $Z_0=Z_1$ varying values of $Z_{near,i}$ and $Z_{far,i}$ will cause differences between corresponding pixel values for $d_0$ and $d_1$. The aim is, thus, to select the prediction weight w accordingly so as to compensate for the differences and, thus, minimize the prediction residual, i.e. $\Delta d_1 = d_1 - w_{opt} \times d_0 = 0$ and $w_{opt} = d_1/d_0$. Using equation 1 $d_i$ can be written as follows:

$$d_i = 255 \frac{Z^{-1} - Z_{far,i}^{-1}}{Z_{near,i}^{-1} - Z_{far,i}^{-1}}$$

In the present example, $Z=Z_0=Z_1$ indicates the physical distance that is assumed to be constant for the purpose of the prediction. Thus, the optimum weight can be written as:

$$w_{opt} = \frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}} \quad (2)$$

Considering this formula 2, a trivial special case that $Z_{near,0} = Z_{near,1}$ and $Z_{far,0} = Z_{far,1}$, i.e. the depth clipping planes do not change. Then, the optimum prediction weight is 1, i.e. no particular weighting.

In another embodiment, a remapping function is assumed for obtaining the prediction weight, see ISO/IEC JTC1/SC29/VVG11 MPEG2011/N12349, December 2011, Test model under consideration for AVC-based 3D video coding (3DV-ATM) by Miska M. Hannuksela, section 4.4 Depth Range Based Weighted Prediction (DRWP). Assume two input sample values denoted a and $a+2^b$, where b is a positive integer. This gives two output sample values $y_1$ and $y_2$. The output sample value y then becomes a linear function of the input sample value $$x: y = \text{round}\left(y_1 + \frac{x-a}{2^b} \times (y_2 - y_1)\right),$$

where round( ) is a function returning the closest integer value. This remapping function can be defined in integer arithmetic as: $y = y_1 + (((x-a) \times (y_2-y_1) + 2^{b-1}) >> b)$, where >> denotes a right bit-shift operation. If an offset o is defined as $o = y_1 + (((-a) \times (y_2-y_1) + 2^{b-1}) >> b)$ and a weight w is defined as $w = y_2 - y_1$ the remapping function becomes identical to explicit weighted prediction $y = (x \times w + 2^{b-1}) >> b + o$. The prediction weight can therefore be expressed as:

$$w = \text{round}\left(\frac{Z_{near,1}^{-1} - Z_{far,1}^{-1}}{Z_{near,0}^{-1} - Z_{far,0}^{-1}} \times 2^b\right) \quad (3)$$

The parameter b can be derived from the camera and view synthesis parameters included in the bitstream.

A further embodiment that performs scaling or weighting that can be used is disclosed in ISO/IEC JTC1/SC29/WG11 MPEG2011/N12559, February 2012, Test Model under Consideration for HEVC based 3D video coding by Heiko Schwartz and Krzystof Wegner, section 2.3.3 Z-near z-far compensated weighted prediction. In this approach a prediction weight is defined as:

$$\frac{Z_{far,0} - Z_{near,0}}{Z_{far,1} - Z_{near,1}} \quad (4)$$

and an offset is defines as $$255\frac{Z_{near,0} - Z_{near,1}}{Z_{far,1} - Z_{near,1}}.$$

Figure 7:
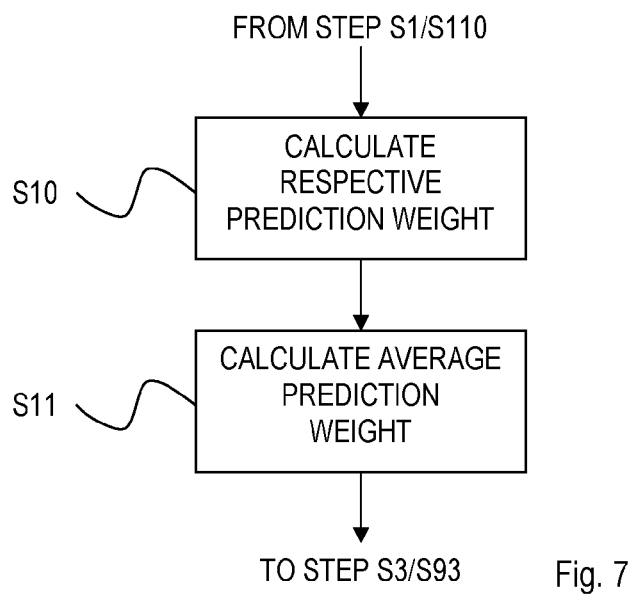
FIG. 7 is a flow diagram illustrating an embodiment of the weight calculating step in FIG. 6 and FIG. 17.

In a particular embodiment, as shown in FIG. 7, the method continues from step S1 in FIG. 6. A next step S10 calculates a respective prediction weight for each pixel of at least one block of pixels, also denoted pixel block or simply block herein, in the reference frame. The respective prediction weight is preferably calculated as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}},$$

wherein Z represents the depth value of the pixel. This means that each pixel in the block of pixels has a respective prediction weight. If the block, for instance, is a macroblock, this means that 16×16 prediction weights are calculated in step S10. A next step S11 calculates a single prediction weight based on the average of the respective prediction weights calculated in step S10. Thus, this average prediction weight is used as optimal prediction weight for the relevant block in the reference frame.

The above presented example of calculating an average prediction weight is quite calculation intensive since a respective prediction weight is calculated for each prediction weight in the block. This could, for instance, amount to calculating from 16 prediction weights for a 4×4 block up to 256 prediction weights for a macroblock. In the new video coding standard High Efficiency Video Coding (HEVC) even larger pixel blocks (denoted coding units) than macroblocks have been proposed.

Another alternative is then that step S2 of FIG. 6 calculates a single prediction weight for the pair of the current frame and the reference frame and based on at least the first depth clipping plane parameter values of these two frames.

In a particular embodiment, step S2 calculates the prediction weight based on or, preferably, as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}}.$$

In this embodiment the parameter Z represents an average depth value for the reference frame.

In an example of this embodiment the average depth value is an average depth for the whole reference frame. Hence, in this example a single prediction weight is calculated for the given pair of the current frame and the reference frame. This embodiment significantly reduces the number of prediction weights that needs to be calculated for the reference frames.

A further alternative is that step S2 of FIG. 6 calculates a prediction weight for a block of pixels in the reference frame comprising multiple such blocks. The prediction weight is calculated based on at least the first dipping plane parameter value of the current frame, at least the first clipping plane parameter value of the reference frame and at least one pixel value representative of the block of pixels.

In a particular embodiment, step S2 calculates the prediction weight based on or, preferably, as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}}.$$

In this embodiment the parameter Z represents an average depth value for the block.

Thus, prediction weights can be calculated as disclosed herein either on pixel basis, block basis or on frame basis. Typically, the coding efficiency improvement is greater for greater granularity, i.e. pixel-specific or block-specific prediction weights as compared to frame-specific prediction weights. However, such an improvement comes at the cost of increased complexity and computations. Therefore, in most practical applications it would generally be sufficient to calculate prediction weights on block or frame basis.

As previously disclosed herein, if the prediction weight is derived on a per-block basis or a per-frame basis, then there is no single value of Z to be used for the derivation since several pixels are covered. In that case, some kind of averaging can be performed. The embodiments can then either use Z as the arithmetic or geometric average of the Z values of the pixels that are covered, i.e. the pixels in the respective block or frame. Alternatively, the formula for calculating prediction weights could be applied separately for each pixel that is covered and then an average weight, e.g. arithmetic or geometric mean, is derived based on the separate weight values.

In the above illustrated example of calculating the prediction weights both $Z_{near}$ and $Z_{far}$ values of the current frame and the reference frame have been used in the weight calculation. The embodiments are, however, not limited thereto. In particular cases the prediction weight is calculated in step S2 of FIG. 6 based on the $Z_{near}$ values of the current frame and the reference frame or based on the $Z_{far}$ values of the current frame and the reference frame.

In an example, three consecutive frames having near depth clipping plane parameter values $Z_{near,0}$, $Z_{near,1}$, $Z_{near,2}$ are assumed and that the current frame to be encoded is frame 1. The prediction weight for frame 0 could then be calculate based on, or preferably equal to, $$w_0 = \frac{Z_{near,2} - Z_{near,1}}{Z_{near,2} - Z_{near,0}} \quad (5)$$

The corresponding prediction weight for frame 2 could be calculated based on, or preferably equal to, $$w_2 = \frac{Z_{near,1} - Z_{near,0}}{Z_{near,2} - Z_{near,0}} \quad (6)$$

The underlying philosophy of these formulas lies in the assumption that luminance changes are linearly proportional to depth clipping plane changes so that the prediction weight is inversely proportional to the distance between two depth clipping planes. Note that the denominator is a normalizing factor that equals zero when $Z_{near,0}=Z_{near,2}$. In such a case, the prediction weights $w_0, w_1$ can be set to 1. Corresponding formulas could also be used for the far depth clipping plane parameter value by exchanging $Z_{near,0}, Z_{near,1}, Z_{near,2}$ with $Z_{far,0}, Z_{far,1}, Z_{far,2}$, i.e.

$$w_0 = \frac{Z_{far,2} - Z_{far,1}}{Z_{far,2} - Z_{far,0}} \quad (7)$$

$$w_2 = \frac{Z_{far,1} - Z_{far,0}}{Z_{far,2} - Z_{far,0}} \quad (8)$$

The formulas based on $Z_{near}$ values and the formulas based on $Z_{far}$ values can be used independently or they can be considered together, for instance, depending on if the massive content of the video is background or foreground. As an example, the combinational effect of both $Z_{near}$ and $Z_{far}$ can be represented by a multiplication of weighting factors of $Z_{near}$ and $Z_{far}$ calculated using above formula respectively, such as $$w_0/2 = \frac{Z_{near,2/1} - Z_{near,1/0}}{Z_{near,2} - Z_{near,0}} \times \frac{Z_{far,2/1} - Z_{far,1/0}}{Z_{far,2} - Z_{far,0}}. \quad (9)$$

Figure 8:
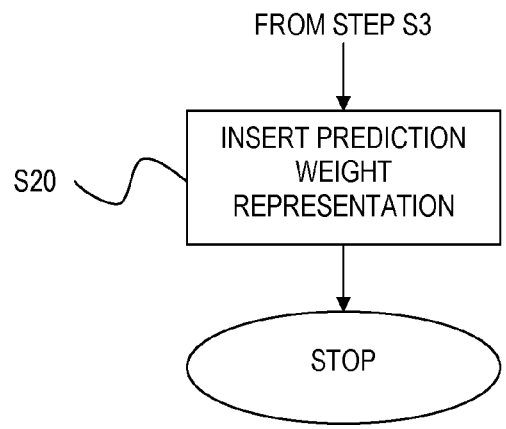
FIG. 8 is a flow diagram illustrating an additional, optional step of the method in FIG. 6 according to an embodiment.

The prediction weights as disclosed in the foregoing could be calculated at the encoder side and then sent as side information in the bitstream, e.g. on a per-block basis or a per-frame basis, to the decoder. FIG. 8 illustrates such an embodiment. The method then continues from step S3 in FIG. 6. A next step S20 inserts an encoded representation of the prediction weight into the encoded representation of the depth map. In this embodiment, the decoder can simply retrieve this encoded representation of the prediction weight and therefore does not have to repeat the prediction weight calculation during decoding.

In another embodiment, the above disclosed calculation of prediction weights in connection with frame encoding is also performed by the decoder in connection with decoding the encoded representation of the depth map. In that case, no side information needs to be sent in the bitstream and the prediction weight could be calculated according to any of the previously disclosed formulas with respective reference pixel values as the parameter Z.

The depth clipping plane parameter values of the current frame and of reference frames can also be used in additional or alternative ways in order to improve the coding efficiency. Such an embodiment is disclosed in FIG. 9. The method generally starts in step S30 where multiple reference frames or candidate reference frames are identified for the current frame. These reference frames could, as previously mentioned herein, be temporal neighboring reference frames preceding or following the current frame in time or be reference frames having the same point in time as the current frame but belonging to other camera views in the case of multiview video coding. A next step calculates a similarity metric for each reference frame identified in step S30. Such a similarity metric is based on the first depth dipping plane parameter value associated with the frame and the first depth dipping plane parameter value associated with the reference frame. The multiple reference frames are then ordered in a reference picture or frame list at least partly based on the similarity metrics calculated in step S32. A next step S33 assigns a respective reference frame index to at least one reference frame identified in step S30 in the reference frame list following the ordering of reference frames in step S32. The encoded representation of the depth map then comprises respective encoded representations of the at least one reference frame index. The method then continues to step S1 of FIG. 6.

In a particular embodiment, step S31 calculates the similarity metrics as an absolute difference between the depth clipping plane parameter value associated with frame and the depth clipping plane parameter value associated with the reference frame.

Figure 9:
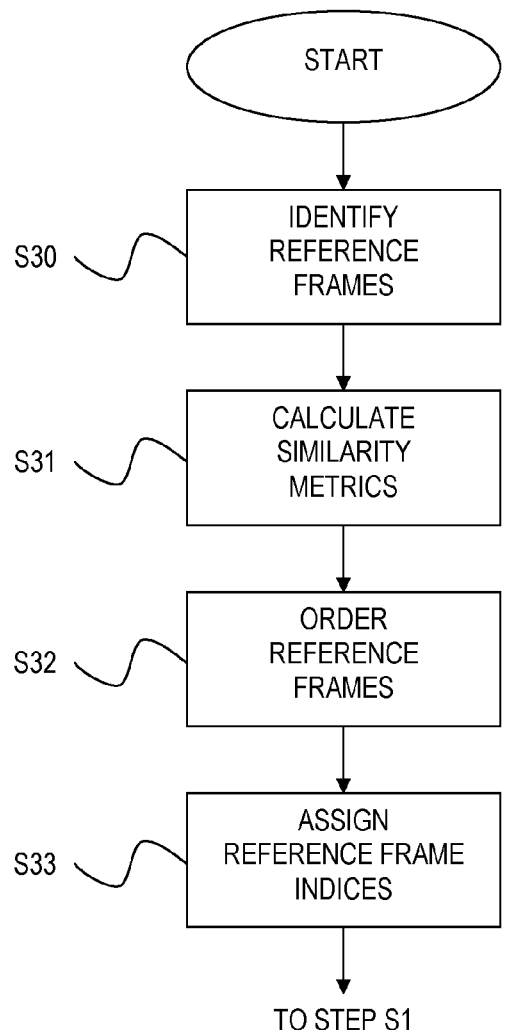
FIG. 9 is a flow diagram illustrating additional, optional steps of the method in FIG. 6 according to an embodiment.
Figure 10:
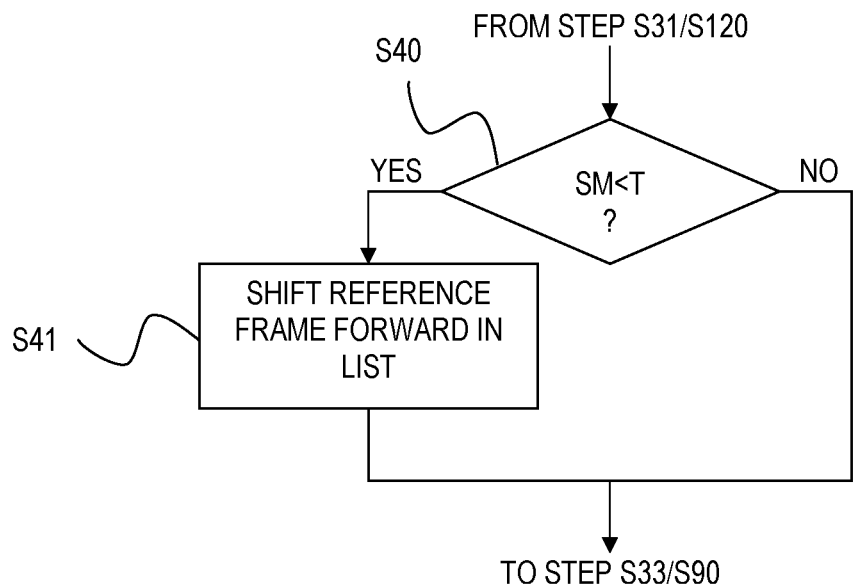
FIG. 10 is a flow diagram illustrating an embodiment of the ordering step in FIG. 9 and FIG. 18.

FIG. 10 is a flow diagram illustrating a particular embodiment of the ordering step S32 in FIG. 9. The method continues from step S31 in FIG. 9. A next step S40 compares the similarity metric (SM) with a threshold value (T). If the similarity metric is smaller than the threshold value the method continues to step S41 where a position of the reference frame is shifted at least one position towards the front of the reference frame list in relation to a preliminary order in which the multiple reference frames are ordered based on their respective distance to the current frame.

Hence, in a particular embodiment the reference frames identified in step S30 of FIG. 9 are first ordered in a preliminary order determined, for instance, based on their respective distance to the current frame. For instance, if the current frame has frame number j, the preliminary reference frame list could be in the order of frame j−1, frame j−2, frame j−3 and so on. If reference frames comprises both temporally preceding and following frames these could be ordered in the same preliminary reference frame list or in two different preliminary frame lists, such as frame j−1, frame j+1, frame j−2, frame j+2 and so on or a first list with frame j−1, frame j−2, frame j−3 and so on and a second list with frame j+1, frame j+2, frame j+3 and so on.

If a reference frame then has a similarity metric that is below the threshold value it is preferably shifted or moved at least one step forward towards the front of the list in step S41. Thus, if the reference frame occupies list position number 3 according to the preliminary order it is preferably shifted to any of the positions 2, 1 or 0 in step S41.

In an embodiment, the reference frames having respective similarity metrics that are smaller than the threshold value are positioned in the front of the reference frame list and their relative positions in the front of the list could be defined based on their respective distance to the current frame. Any reference frames for which their respective similarity metric is not smaller than the threshold value come after these reference frames in the reference frame list. These last reference frames could have their relative positions in the back of the list defined based on their respective distance to the current frame.

In an alternative approach, step S41 shifts the position of a reference frame a predefined number of steps, such as one step, towards the front of the list and relative to their original position according to the preliminary order.

The above presented embodiments of differentiating between reference frames having small similarity metrics (SM<T) and large similarity metrics (SM≥T) can be extended to the case using more than a single threshold value. For instance, reference frames having SM<$T_1$ is placed at the front in the reference frame list, reference frames having $T_1 \leq$ SM<$T_2$ are positioned in the middle of the reference frame list and reference frames having SM$\geq T_2$ are placed at the back of the reference frame list, where $T_1 < T_2$. Alternatively, reference frames having SM<$T_1$ could shift their position k steps forward relative to their original position according to the preliminary order and reference frames having $T_1 \leq$ SM<$T_2$ could shift their position l step(s) forward relative to their original position, where k>l. This can of course be extended to cases with more than two different thresholds.

In many codecs, reference frame indices are coded using variable length coding, which means that the lower the value of the reference frame index the shorter the codeword assigned to it. In the prior art, the reference frames are sorted based on their distances from the current frame. According to this aspect the reference frame ordering can be affected so that the reference frames having low similarity metrics are positioned in front of the reference frame list and consequently have lower index values.

The similarity metric could, in an example, be calculated as $\Delta Z_{near} = |Z_{near,1} - Z_{near,0}|$. This similarity metric is preferably calculated for every reference frame the current frame is dependent on. A threshold value T is then applied to classify those reference frames having $\Delta Z_{near} <$ T as "similar_$Z_{near}$". A similar categorization could alternatively, or in addition, be carried out for $Z_{far}$ to get a similarity metric of $\Delta Z_{far} = |Z_{far,1} - Z_{far,0}|$. The same threshold value or a different threshold values could be used to categorize reference frames as "similar_$Z_{far}$".

Hence, in an embodiment the ordering of reference frames in step S32 of FIG. 9 is based on a similarity metric calculated based on $Z_{near}$ values, calculated based on $Z_{far}$ values or calculated based on both $Z_{near}$ and $Z_{far}$ values, such as $\Delta Z = |Z_{near,1} - Z_{near,0}| + |Z_{far,1} - Z_{far,0}|$.

The reordering of reference frames in the reference frame list could be signaled implicitly. Hence, in such a case, the decoder calculates the similarity metrics for each reference frame in the reference frame list based on the depth clipping plane parameters signaled in the bitstream. The encoder and the decoder then use the same ordering rule for shifting positions of the reference frame in the reference frame list based on the similarity metrics. No explicit signaling of any shifting commands are thereby needed.

Figure 11:
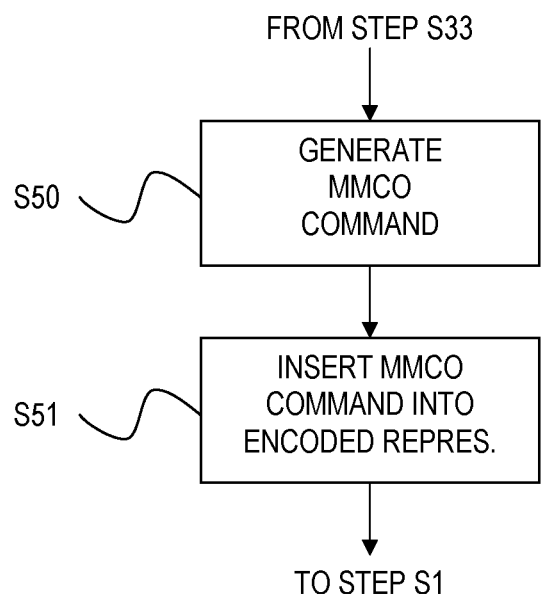
FIG. 11 is a flow diagram illustrating additional, optional steps of the method in FIG. 6 according to an embodiment.

FIG. 11 illustrates another approach with explicit signaling. The method continues from step S33 in FIG. 9. A next step S50 generates a memory management control operation (MMCO) command based on the similarity metrics. This MMCO command indicates the updated order of the reference frame in the reference frame list. This MMCO command is inserted in step S51 into the encoded representation of the depth map. The decoder can then simply retrieve the MMCO command to perform the correct ordering of the reference frames in the reference frame list without the need to calculate any similarity metrics.

Figure 12:
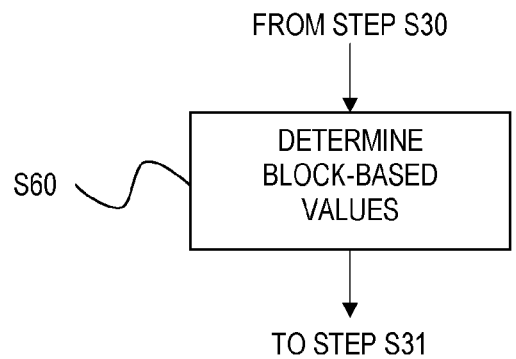
FIG. 12 is a flow diagram illustrating an additional, optional step of the method in FIG. 9 according to an embodiment.

The approach of ordering reference frames in the reference frame list based on depth clipping plane parameters could be performed on frame basis or on block basis as shown in FIG. 12. In this case the method continues from step S30 in FIG. 9. A next step S60 determines a block-based value for each block of pixels of multiple such blocks in the current frame. The block-based value determined in step S60 is representative of an average pixel value for the block. Thus, the block-based value could the average luminance value for the block of pixels.

The method then continues to step S31 of FIG. 9. This step S31 calculates a near similarity metric for each reference frame identified in step S30 based on the near depth clipping plane parameter value associated with the frame and the near depth clipping plane parameter value associated with the reference frame. These near similarity metrics are preferably calculated as $\Delta Z_{near} = |Z_{near,1} - Z_{near,0}|$. Step S31 preferably also calculates a far similarity metric for each reference frame based on the far depth dipping plane parameter value of the current frame and the far depth dipping plane parameter value of the reference frame. These far similarity metrics are preferably calculated as $\Delta Z_{far} = |Z_{far,1} - Z_{far,0}|$.

If the block-based value determined in step S60 of FIG. 12 is equal to or exceeds a threshold value the multiple reference frames are preferably ordered for the current block based on the near similarity metrics. However, if the block-based value is below the threshold value the multiple reference frames are preferably instead ordered for the current block based on the far similarity metrics.

Thus, for blocks with high luminance values (block-based value equal to or exceeding the threshold value) the "similar_$Z_{near}$" group is promoted, whereas the "similar_$Z_{far}$" group is not handled specially. For blocks with low luminance value (block-based value below the threshold value) the "similar_$Z_{far}$" group is promoted. The "similar_$Z_{near}$" group is not handled specially.

Thus, in this embodiment the multiple reference frames are preferably first ordered in a preliminary order based on their respective distances to the current frame. This preliminary order is then updated for each block of pixels in the current frame based either on the near similarity metrics or the far similarity metrics. For instance, a block number 1 in the current frame has a very high luminance value, i.e. large block-based value. This means that the reference frames that belong to the "similar_$Z_{near}$" group should be promoted, such as moved forward a fixed number of steps as compared to the preliminary order or moved up to the front of the list. Thereafter reference frame indices are set for the updated list order. If a next block number 2 in the current frame instead has low luminance values, the preliminary order is updated based on the far similarity metrics by promoting the "similar_$Z_{far}$" group, such as moving those reference frames for which $\Delta Z_{far} = |Z_{far,1} - Z_{far,0}| <$ T a fixed number of steps forward in the list or move these reference frames up to the front of the list.

The reordering of reference frames on block-basis as disclosed above could be implicitly signaled to the decoder or explicitly signaled using MMCO commands as previously disclosed herein.

The embodiments of reordering reference frames based on depth clipping plane parameters discussed above and in connection with FIGS. 9 to 12 could be applied as specific embodiments to the predictive encoding using prediction weights calculated based on depth clipping plane parameters. In an alternative approach, these embodiments are used separately from any prediction weights calculated based on depth clipping plane parameters. In such a case, the embodiments could be applied to prior art predictive encoding using prior art prediction weights or indeed no prediction weights at all.

An aspect of these embodiments then relates to a method of ordering reference frames in a reference frame list for a depth map in the form of a frame of multiple pixels, where each pixel of the multiple pixels has a respective pixel value representing a respective distance between a camera and a respective object. The method comprises identifying multiple reference frames for the frame. A next step calculates, for each reference frame of the multiple reference frames, a similarity metric based on at least a first depth clipping plane parameter value associated with the frame and at least a first depth dipping plane parameter value associated with the reference frame. The method further comprises ordering the multiple reference frames in a reference frame list based at least partly on the similarity metrics. A next optional step assigns a respective reference frame index for at least one reference frame of the multiple reference frames in the reference frame list. This optional step could assign a respective reference frame index to each reference frame in the reference frame list.

The ordering of reference frames in the list are performed based on depth clipping plane parameter values of the current frame and of the reference frames and optionally also based on the distance, such as distances in time and/or inter-view distances, between the current frame and the reference frame.

The various embodiments discussed above in connection with FIGS. 9 to 12 could be applied as particular implementation examples of the aspect mentioned above.

Depth clipping plane parameters can also be used in other ways to improve the encoding and reduce complexity. Such a way is disclosed in FIG. 13. The method starts in step S70 which identifies multiple candidate reference frames for a current frame. This step S70 basically corresponds to step S30 in FIG. 9 and is not further discussed herein. A next step S71 calculates a similarity metric for each candidate reference frame identified in step S70. The similarity metric is calculated based on at least a first depth dipping plane parameter value associated with the current frame and at least a first depth clipping plane parameter value associated with the candidate reference frame. This step S71 basically corresponds to step S31 in FIG. 9.

A next step S72 identifies at least one reference frame for the current frame among the multiple candidate reference frames identified in step S70. The reference frame identified in step S72 has a similarity metric as calculated in step S71 that is less than a threshold value. A next step S73 performs a motion search among the at least one reference frame identified in step S72 for each block of pixels in the current frame. The method then continues to step S1 of FIG. 6.

Motion search is one of the most time consuming processes in video encoding. The embodiment disclosed above in connection with FIG. 13 performs such motion search only among those candidate reference frames that belong to the "similar_$Z_{near}$" group, i.e. having $\Delta Z_{near}=|Z_{near,1}-Z_{near,0}|<T$, only among those candidate frames that belong to the "similar_$Z_{far}$" group, i.e. having $\Delta Z_{far}=|Z_{far,1}-Z_{far,0}|<T$, or only among those candidate frames that belong to the "similar_$Z_{near}$" group or the "similar_$Z_{far}$" group. This means that it is possible, according to these embodiments, to skip motion search on those candidate reference frames that have large similarity metrics. This significantly reduces complexity during encoding.

Thus, in an embodiment an initial set of candidate reference frames is identified for a current frame in step S70, such as based on the point of time of the current frame and the camera view of the current frame. Step S72 then selects a subset of these candidate reference frames for which the motion search is performed. This subset is selected based on the depth clipping plane parameter values of the current frame and the candidate reference frames. Hence, the motion search is preferably only performed on those candidate reference frames having $Z_{near}$ and/or $Z_{far}$ that are close to the $Z_{near}$ and/or $Z_{far}$ of the current frame.

Another less radical approach is to use shorter searching range or limit the searching position to integer pixels for those candidate reference frames that are regarded as not belonging to the "similar_$Z_{near}$" group or the "similar_$Z_{far}$" group.

The embodiments of limiting motion searches among reference frames based on depth clipping plane parameters discussed above and in connection with FIG. 13 could be applied as specific embodiments to the predictive encoding using prediction weights calculated based on depth dipping plane parameters and/or the ordering of reference frames in the reference frame list based on depth dipping plane parameters. In an alternative approach, these embodiments are used separately from any prediction weights calculation or reference frame ordering based on depth dipping plane parameters. In such a case, the embodiments could be applied to prior art predictive encoding using prior art prediction weights or indeed no prediction weights at all and prior art ordering of reference frames in the reference frame list.

An aspect of these embodiments then relates to a method of performing motion search for a depth map in the form of a frame of multiple pixels, each pixel of the multiple pixels has a respective pixel value representing a respective distance between a camera and a respective object. The method comprises identifying multiple candidate reference frames for the frame. A next step calculates, for each candidate reference frame of the multiple candidate reference frames, a similarity metric based on at least a first depth dipping plane parameter value associated with the frame and at least a first depth clipping plane parameter value associated with the candidate reference frame. The method also comprises identifying, among the multiple candidate reference frames, at least one reference frame having a similarity metric that is less than a threshold value. A next step performs, for at least one, preferably each, block of pixels among multiple blocks of pixels in the frame, a motion search among, and preferably only among, the at least one reference frame having a similarity metric that is smaller than the threshold value.

Figure 13:
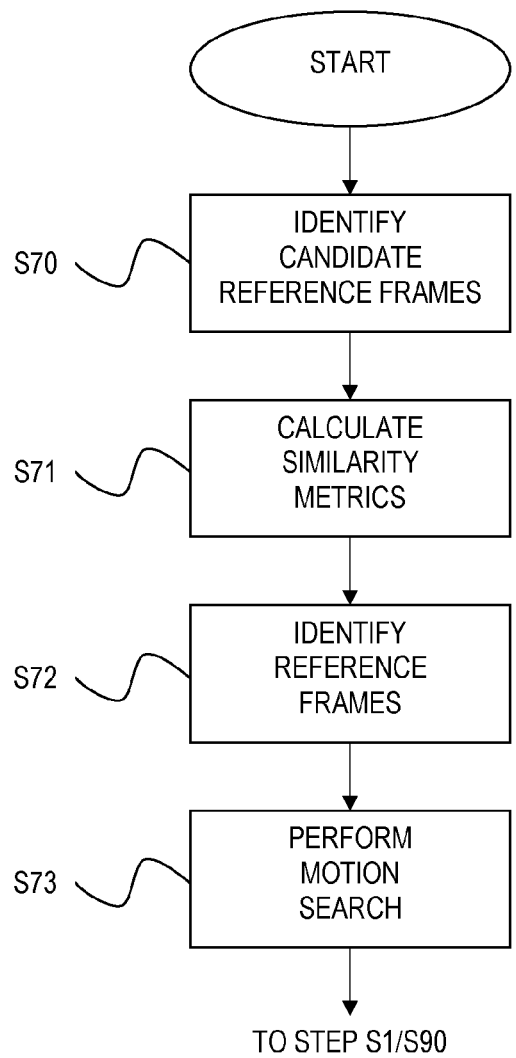
FIG. 13 is a flow diagram illustrating additional, optional steps of the method in FIG. 6 and FIG. 15 according to an embodiment.
Figure 14:
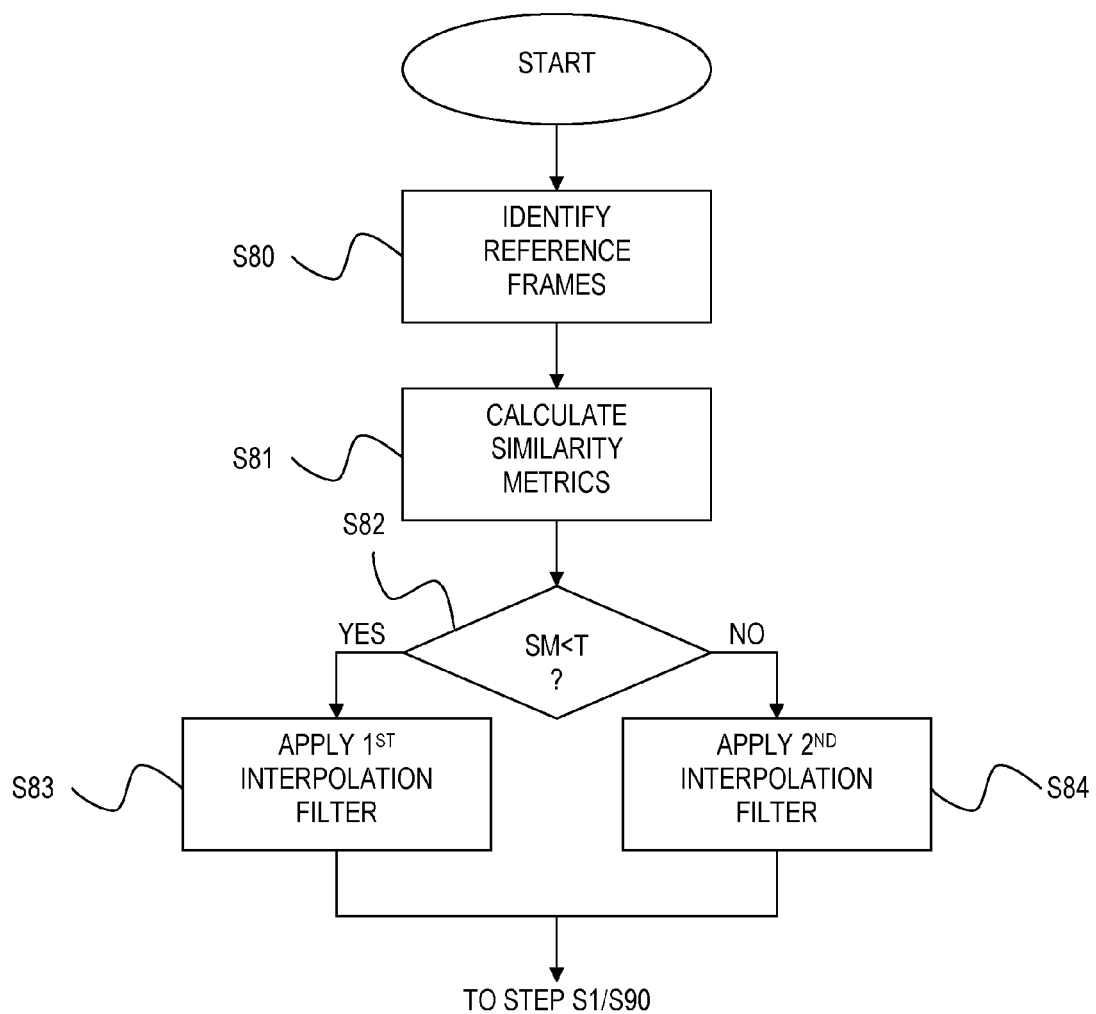
FIG. 14 is a flow diagram illustrating additional, optional steps of the method in FIG. 6 and FIG. 15 according to another embodiment.

Another approach of reducing complexity in connection with depth map encoding is disclosed in FIG. 14. The method starts in step S80 which identifies multiple reference frames for the current frame. This step S80 basically corresponds to steps S30 of FIG. 9 and step S70 of FIG. 13. A next step S81 calculates a similarity metric for each reference frame identified in step S80. This similarity metric is calculated based on the first depth clipping plane parameter associated with the frame and the first depth clipping plane parameter value associated with the reference frame. This step S81 basically corresponds to step S31 of FIG. 9 and step S71 of FIG. 13. The method continues to step S82 which compares the similarity metric (SM) calculated in step S81 for the reference frame with a threshold value (T). If the similarity metric is smaller than the threshold value the method continues to step S83 which applies a first interpolation filter to the reference frame during the motion search procedure. However, if the similarity metric is equal to or larger than the threshold value the method continues from step S82 to step S84 which instead applies a second, different interpolation filter to the reference frame during the motion search procedure. The method then continues to step S1 of FIG. 6.

In this embodiment different interpolation filters are applied to reference frames depending on their depth clipping plane parameters. In a particular embodiment simpler interpolation filters are preferably applied to reference frames having depth clipping plane parameter values that differ from the depth clipping plane parameter value of the current frame, i.e. similarity metric equal to or exceeding the threshold value. For instance, the interpolation filter applied in step S83 could generate quarter-pel values or positions, such as using a 6-tap Wiener interpolation filter for half-pel positions and a bilinear filter to get quarter-pel positions. In such a case, the interpolation filter applied in step S84 could be limited to half-pel positions, such as only using the 6-tap Wiener interpolation filter but not the bilinear filter. In an alternative approach, step S83 could use interpolation filter(s) enabling half-pel or quarter-pel positions, whereas step S84 does not use any interpolation filter at all to thereby only use integer pixel positions.

A further variant is to use at least one adaptive interpolation filter in step S83, whereas step S84 is restricted to using a fixed interpolation filter or a set of fixed interpolation filters.

The embodiments of selecting interpolation filter based on depth clipping plane parameters discussed above and in connection with FIG. 14 could be applied as specific embodiments to the predictive encoding using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth dipping plane parameters. In such a case, the embodiments could be applied to prior art predictive encoding using prior art prediction weights or indeed no prediction weights at all and prior art ordering of reference frames in the reference frame list.

An aspect of these embodiments then relates to an interpolation filtering method for a depth map in the form of a frame of multiple pixels, each pixel of the multiple pixels has a respective pixel value representing a respective distance between a camera and a respective object. The method comprises identifying at least one, preferably multiple reference frames for the frame. A next step calculates, for each reference frame of the at least one or multiple reference frames, a similarity metric based on at least a first depth clipping plane parameter value associated with the frame and at least a first depth clipping plane parameter value associated with the reference frame. The method also comprises applying a first interpolation filter or a first set of interpolation filters to any reference frame of the at least one or multiple reference frames for which the similarity metric is less than a threshold value. Correspondingly, the method comprises applying a second, different interpolation filter or a second, different set of interpolation filters to any reference frame of the at least one or multiple reference frames for which the similarity metric is equal to or larger than the threshold values.

FIG. 15 is a flow diagram illustrating a method of predictive decoding of an encoded representation of depth map in the form of a frame of multiple pixels, where each of these pixels has a respective pixel value representing a respective distance between a camera and a respective object.

In a general embodiment, the method comprises providing, in step S92 and based on the encoded representation of the depth map, a prediction weight calculated based on at least a first depth clipping plane parameter value associated with the frame and at least a first depth clipping plane parameter value associated with a reference frame. A decoded representation of the depth map is determined in step S93 based on a prediction residual for the frame 10 and at least one pixel value of the reference frame 20, 30 weighted by the prediction weight.

Various particular embodiments of this general embodiment will now be further described.

In a particular embodiment, the method of FIG. 15 generally starts in an optional but preferred step S90 which identifies a reference frame among multiple reference frames based on the encoded representation of the depth map.

In a typical implementation the encoded representation comprises a reference frame index identifying the reference frame. Step S90 then preferably involves retrieving and possibly decoding the reference frame index, if provided in an encoded form in the encoded representation of the depth map. The reference frame is then identified using the retrieved and possibly decoded reference frame index. The reference frame may be identified by the reference frame index in a reference frame or picture list as has been previously discussed herein.

Step S90 of FIG. 15 could involve identifying a single reference frame as decoding reference for the current frame or identifying multiple reference frames. In the latter case, multiple reference frame indices can be provided and used to identify the reference frames, for instance from a single or multiple reference frame lists.

Optional but preferred step S91 determines a prediction residual for the current frame based on the encoded representation of the depth map. Step S91 typically involves retrieving a codeword as encoded representation of the prediction residual from the encoded representation of the depth map. The prediction residual may then be obtained from this codeword by decoding the codeword according techniques well known in the art.

Steps S90 and S91 can be performed serially in any order or at least partly in parallel.

A next step S92 provides a prediction weight based on the encoded representation of the depth map. This prediction weight is calculated based on at least a first depth clipping plane parameter value associated with the frame and at least a first depth clipping plane parameter value associated with the reference frame identified in step S90.

If step S90 identified multiple reference frames, step S92 preferably provides a respective prediction weight for each identified reference frame.

The following step S93 determines a decoded representation of the frame based on the prediction residual determined in step S91 and at least one pixel value of the reference frame identified in step S90 weighted by the prediction weight provided in step S92. Hence, pixel values of pixels in the current depth map are determined based on the prediction residual and weighted pixel values from the reference frame.

As is well known in the art, encoding and decoding of pixels are typically performed for blocks of pixels. Step S93 then preferably involves generating a decoded representation of such a block of pixels in the current frame based on the prediction residual and weighted pixel values from an area of the reference frame, where this area is identified based on a motion vector signaled in the encoded representation of the depth map. Hence, step S93 preferably retries and decoded an encoded representation of the motion vector and uses it to identify the pixel values in the reference frames that should be weighted by the prediction weight.

If bidirectional prediction has been used for the current block of pixels step S93 preferably determines the decoded representation of the block of pixels based on the prediction residual, a first prediction weight and pixel values of a first reference frame, such as identified by a first motion vector, and a second prediction weight and pixel values of a second reference frames, such as identified by a second motion vector.

Step S93 is then preferably repeated for each block of pixels of the current frame to be decoded. In such a case, different reference frames and thereby different prediction weights can be used for the different blocks of pixels or the same reference frame(s) and prediction weight(s) could be used for all blocks of pixels in the current frame or at least within a slice of the current frame.

FIG. 16 illustrates a particular embodiment of step S92 in FIG. 15. The method continues from step S91 and retrieves an encoded representation of the prediction weight from the encoded representation of the depth map in step S100. Thus, in this embodiment the encoded representation of the depth map and therefore the bitstream comprises the prediction weight, typically in an encoded form. This means that no calculation of the prediction weight based on depth clipping plane parameter values is needed at the decoder since this calculation has already been done at the encoder. The decoder therefore simply retrieves and possibly decodes the prediction weight in step S100 and then continues to step S93 in FIG. 15, where the prediction weight is used.

The embodiment discussed above and disclosed in FIG. 16 reduces the amount of calculations and thereby the decoding complexity at the decoder. However, this comes at the cost of extra overhead since the prediction weights need to be signaled in the bitstream.

FIG. 17 is a flow diagram illustrating another embodiment of providing the prediction weight in step S92 of FIG. 15. The method continues from step S91 in FIG. 15. A next step S110 retrieves encoded representations of the depth clipping plane parameter values associated with the current frame and the reference frame from the encoded representation of the depth map. These depth clipping plane parameter values need to be signaled to the decoder in order to calculate depth values from the pixel values, i.e. luminance values, according to equation 1. Hence, these depth clipping plane parameter values are already present in the bitstream. No additional overhead is thereby required.

The retrieved and possibly decoded depth clipping plane parameter values are used in step S111 to calculate the prediction weight. This calculation in step S111 is basically performed as in step S2 of FIG. 6. In this embodiment both the encoder and the decoder calculates the prediction weights based on the depth clipping plane parameter values.

As previously disclosed herein, step S110 could involve retrieving encoded representations of a respective near depth clipping plane parameter value and a respective far depth clipping plane parameter values associated with the current frame or the reference frame. In such a case, step S111 calculates the prediction weight based on the near and far depth clipping plane parameter values. In an embodiment, the prediction weight is calculated based on a quotient between a difference between the far and near depth clipping plane parameter values associated with the current frame and a difference between the far and near depth clipping plane parameter values associated with the reference frames.

The prediction weight is preferably calculated according to any of the previously disclosed equations, such as any of equations 2 to 9, and in particular according to equation 2.

In similar to the previous discussion in connection with FIG. 7, the prediction weight could be calculated by calculating a respective prediction weight according to equation 2 for each pixel of at least one block of pixels in the reference frame in step S10. The parameter Z then represents the depth value of the pixel. The prediction weight is then calculated as an average of the respective prediction weights in step S11.

In an alternative approach, a single prediction weight is calculated in step S111 of FIG. 17 for the pair of the current frame and the reference frame based on depth clipping plane parameter values. This single prediction weight could be calculated as previously disclosed herein according to equation 2 with the parameter Z representing an average depth value for the reference frame.

In another embodiment, a prediction weight is calculated in step S111 for a block of pixels in the reference frame based on the depth clipping plane parameter value associated with the current frame and the reference frame and based on at least one pixel value representative of the block of pixels. For instance, the prediction weight could be calculated as previously disclosed herein using equation 2. In such a case, the parameter Z preferably represents an average depth value for the block of pixels.

Hence, any of the embodiments and examples of calculating prediction weights based on depth clipping plane parameter values previously discussed and disclosed in connection with encoding of depth maps could also be used at the decoder side.

The embodiments of using prediction weights in connection with decoding of depth maps and where these prediction weights have been calculated based on depth clipping plane parameter values could be complemented with other techniques of improving coding efficiency and reducing complexity as previously discussed herein.

Figure 18:
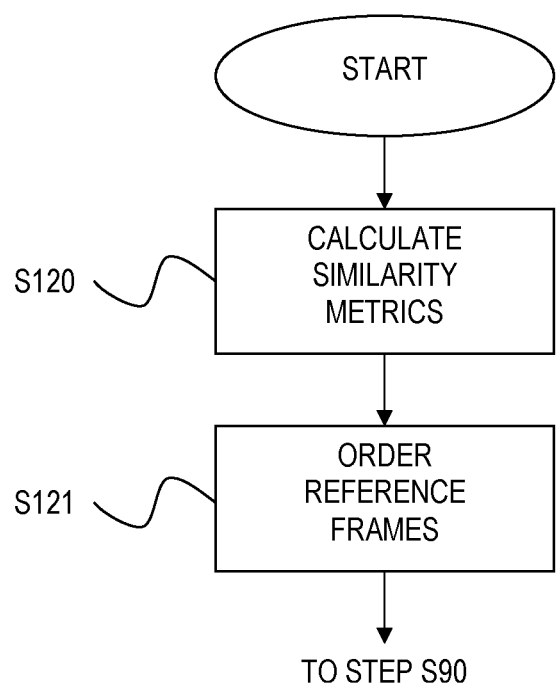
FIG. 18 is a flow diagram illustrating additional, optional steps of the method in FIG. 15 according to an embodiment.

For instance, ordering or reordering of reference frames in a reference frame list based on depth clipping plane parameter values could be used in connection with the decoding. FIG. 18 illustrates such an embodiment.

The method then preferably starts in step S120 by calculating a respective similarity metric for each reference frame in a reference frame list. This similarity metric is calculated as previously disclosed herein based on at least a first depth clipping plane parameter value associated with the current frame and at least a first depth clipping plane parameter value associated with the reference frame. This step S120 basically corresponds to step S31 of FIG. 9.

As previously described herein, the reference frame list preferably comprises neighboring or adjacent reference frames with regard to the current frame in the stream of frames. Hence, temporarily neighboring frames and optionally neighboring frames belonging to other camera views but preferably having a same point in time as the current frame could be included in one or more reference frame lists. The calculating of step S120 is preferably performed for each such reference frame.

A next step S121 orders the reference frames in the reference frame list based at least partly on the similarity metrics calculated in step S120. The method then continues to step S90 of FIG. 15 where the reference frame is identified from the ordered reference frame list based on a reference frame index provided based on the encoded representation of the depth map and typically by retrieving the reference frame index from the encoded representation of the depth map in an encoded form and decoding this retrieved data.

The ordering of step S121 could be performed by ordering the reference frames in a preliminary or default order based on their respective relative distances (in time or in view) to the current frame. Thereafter any reordering of reference frames based on the similarity metrics is preferably performed.

This means that the reference frames are (re)ordered in the reference frame list based on the depth clipping plane parameter values preferably prior to using the reference frame indices for identifying the correct reference frame in step S90 of FIG. 15. The reference frame indices typically indicate a position in the reference frame list, such as position 0, position 1, position 2, etc., i.e. implicit or relative identifiers of reference frames. It is then important that the correct reference frame occupies the position which a reference frame index points to. Hence, the ordering of reference frames in step S121 is therefore preferably performed prior to using the reference frame indices.

FIG. 10 illustrates an embodiment of ordering reference frames. In this embodiment the similarity metric is preferably calculated as an absolute difference between the first (near or far) depth clipping plane parameter value associated with the current frame and the first (near or far) depth clipping plane parameter value associated with the reference frame. If the similarity metric is below a threshold value as concluded in the comparison of step S40 the position of the reference frame in the reference frame list is shifted at least one position towards the front of the reference frame list. Hence, those reference frames that have a (near or far) depth clipping plane parameter value that is close to the (near or far) depth dipping plane parameter value of the current frame are moved towards the front of the reference frame list and can therefore use shorter, in terms of bits, reference frame indices as compared to reference frames that are positioned towards the end of the reference frame list.

Figure 19:
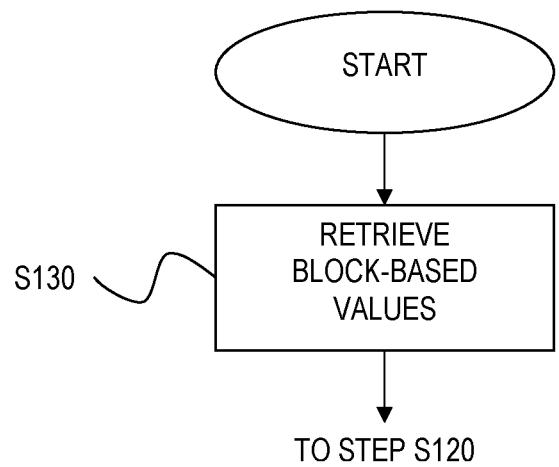
FIG. 19 is a flow diagram illustrating an additional, optional step of the method in FIG. 18 according to an embodiment.

FIG. 19 illustrates a particular embodiment where a block-based value representative of an average pixel value for a block of pixels in the current frame is determined based on or retrieved from the encoded representation of the depth map in step S130. Step S120 of FIG. 18 then preferably comprises calculating a respective near similarity metric based on the near depth dipping plane parameter values of the current frame and of each reference frame and a respective far similarity metric based on the far depth clipping plane parameter values of the current frame and of each reference frame.

If the block-based value retrieved or determined in step S130 of FIG. 19 is below a threshold value the far similarity metrics are preferably used when ordering the reference frames in step S121 for the current block of pixels. However, if the block-based value is equal to or exceeds the threshold value the near similarity metrics are instead used when ordering the reference frames for the current block of pixels. In this embodiment, the reference frames are preferably first ordered in the preliminary order based on relative distances to the current frame and any reordering in step S121 is performed based on the far or near similarity metrics for each block of pixels in the current frame starting from the preliminary order.

The embodiments of reordering reference frames based on depth dipping plane parameters discussed above and in connection with FIGS. 18 and 19 could be applied as specific embodiments to the predictive decoding using prediction weights calculated based on depth clipping plane parameters. In an alternative approach, these embodiments are used separately from any prediction weights calculated based on depth clipping plane parameters. In such a case, the embodiments could be applied to prior art predictive decoding using prior art prediction weights or indeed no prediction weights at all.

An aspect of these embodiments then relates to a method of ordering reference frames in a reference frame list for a depth map in the form of a frame of multiple pixels, where each pixel of the multiple pixels has a respective pixel value representing a respective distance between a camera and a respective object. The method comprises identifying multiple reference frames for the frame. A next step calculates, for each reference frame of the multiple reference frames, a similarity metric based on at least a first depth clipping plane parameter value associated with the frame and at least a first depth clipping plane parameter value associated with the reference frame. The method further comprises ordering the multiple reference frames in a reference frame list based at least partly on the similarity metrics. An optional step of the method comprises identifying a reference frame from the reference frame list following the ordering step and based on a reference frame index obtained based on an encoded representation of the depth map.

The various embodiments discussed above in connection with FIGS. 18 and 19 could be applied as particular implementation examples of the aspect mentioned above.

Depth clipping plane parameters can also be used in other ways to improve the decoding and reduce complexity. Such a way is disclosed in FIG. 13 previously disclosed herein. Thus, performing motion search could be restricted to those candidate reference frames having a respective similarity metric that is less than a threshold value. Hence, the embodiments previously discussed herein in connection with FIG. 13 can also be applied at the decoder.

The embodiments of limiting motion searches among reference frames based on depth clipping plane parameters could be applied as specific embodiments to the predictive decoding using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth clipping plane parameters. In such a case, the embodiments could be applied to prior art predictive decoding using prior art prediction weights or indeed no prediction weights at all and prior art ordering of reference frames in the reference frame list.

Another approach of reducing complexity in connection with depth map decoding is disclosed in FIG. 14. Thus, the embodiments previously discussed in connection with FIG. 14 and relating to using similarity metrics, and hence depth clipping plane parameter values, to select interpolation filters can also be employed during the decoding.

The embodiments of selecting interpolation filter based on depth clipping plane parameters discussed above and in connection with FIG. 14 could be applied as specific embodiments to the predictive decoding using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth dipping plane parameters. In such a case, the embodiments could be applied to prior art predictive decoding using prior art prediction weights or indeed no prediction weights at all and prior art ordering of reference frames in the reference frame list.

Figure 21:
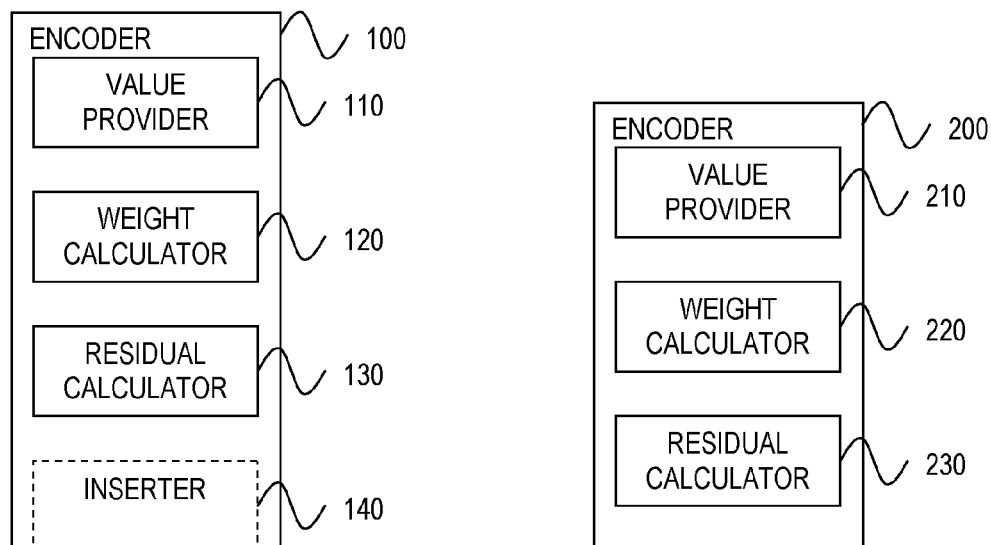
FIG. 21 is a schematic block diagram of an encoder according to an embodiment.

FIG. 21 is a schematic block diagram of an encoder for predictive encoding of a depth map in the form of a frame of multiple pixels according to an embodiment. The encoder 100 comprises a value provider configured to provide at least a first depth clipping plane parameter value associated with current frame and at least a first depth clipping plane parameter associated with a reference frame. These depth clipping plane parameter values are used by a weight calculator 120 for calculating a prediction weight A residual calculator 130 of the encoder 100 is configured to calculate a prediction residual for the frame based on at least one pixel value of the current frame and at least one pixel value of the reference frame weighted by the prediction weight calculated by the weight calculator 120. An encoded representation of the depth map comprises the calculated prediction residual, typically in an encoded form.

The value provider 110 preferably provides respective near and far depth clipping plane parameter values associated with the current frame or the reference frames. These near and far depth clipping plane parameter values are then used by the weight calculator 120 to calculate the prediction weight, such as based on a quotient between the far and near depth clipping plane parameter values associated with the current frame and the far and near depth clipping plane parameter values associated with the reference frame.

The weight calculator 120 could be configured to calculate the prediction weight according to any of the previously discussed embodiments and examples, such as according to any of equations 2 to 9.

For instance, a respective prediction weight could be calculated for each pixel of at least one block of pixels in the reference frame, such as according to equation 2 by the weight calculator 120. The weight calculator 120 also calculates the prediction weight, for the block of pixels, based on an average of these respective prediction weights.

In an alternative approach, a single prediction weight is calculated by the weight calculator 120 for the pair of the current frame and the reference frame, such as according to equation 2 and using an average depth value for the reference frame.

A further possibility is to calculate a prediction weight for a block of pixels in the reference frame based on the depth clipping plane parameter values and at least one pixel value representative of the block of pixels, such as according to equation 2 and an average depth value for the block of pixels.

In an optional embodiment, the encoder 100 also comprises an inserter 140 configured to insert an encoded representation of the prediction weight calculated by the weight calculator 120 into the encoded representation of the depth map.

Figure 22:
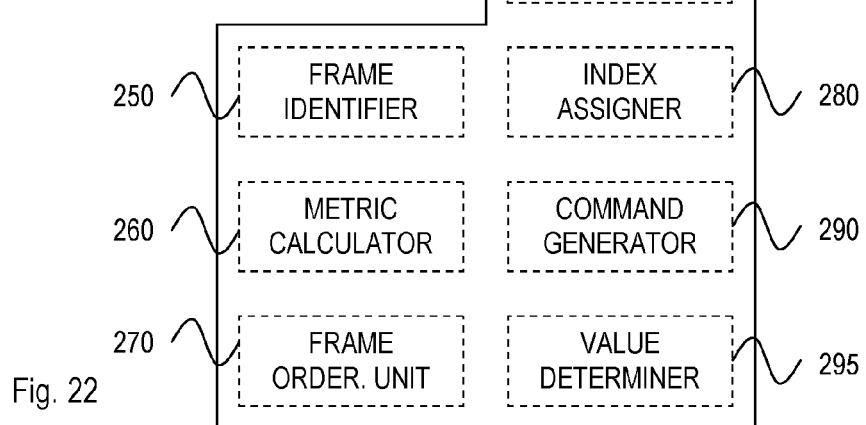
FIG. 22 is a schematic block diagram of an encoder according to another embodiment.

FIG. 22 is a schematic block diagram of another embodiment of an encoder 200. This encoder 200 comprises the value provider 210, the weight calculator 220, the residual calculator 230 and the optional inserter 240, which preferably operate as previously described in connection with FIG. 21.

The encoder 200 preferably also comprises a frame identifier 250 configured to identify multiple reference frames for the current frame. The frame identifier 250 preferably identifies the reference frames as discussed in connection with step S30 of FIG. 9. A metric calculator 260 is preferably implemented in the encoder 200 to calculate a similarity metric for each reference frame identified by the frame identifier 250. The metric calculator 260 calculates a similarity metric based on a depth dipping plane parameter value associated with the current frame and a depth dipping plane parameter value associated with the reference frame, such as an absolute difference between the far or near depth clipping plane parameter values of the current frame and the reference frame.

The encoder 200 also comprises a frame ordering unit 270 configured to order the multiple reference frames identified by the frame identifier 250 in a frame list based on the similarity metrics calculated by the metric calculator 260. An index assigner 280 is configured to assign a respective reference frame index to at least one reference frame in the reference frame list. This at least one reference frame index, or an encoded version thereof, is then comprised in the encoded representation of the depth map.

Figure 23:
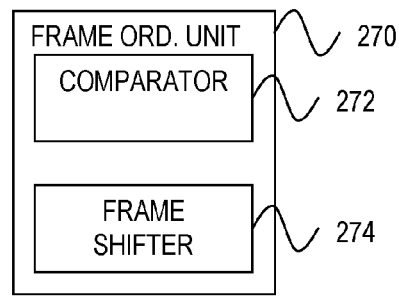
FIG. 23 is a schematic block diagram of an embodiment of the frame ordering unit in FIG. 22.

FIG. 23 is a schematic block diagram of a particular embodiment of the frame ordering unit 270 in FIG. 22. The frame ordering unit 270 comprises a comparator 272 configured to compare the similarity metric calculated by the metric calculator for a reference frame with a threshold value. A frame shifter 274 then shifts a position of the reference frame at least one position towards the front in the reference frame list as compared to a preliminary order of the multiple reference frames obtained based on their respective distance to the current frame.

The frame shifter 274 could operate according to various embodiments as previously discussed herein in connection with step S41 of FIG. 10.

In an optional embodiment, the encoder 200 in FIG. 22 comprises a command generator 290 configured to generate a MMCO command based on the similarity metrics. The MMCO command thereby indicates the order of the multiple reference frames in the reference frame list. This MMCO command is inserted by the inserter 240 into the encoded representation of the depth map. This means that the decoder does not, in this embodiment, need to calculate any similarity metrics but can simply use the MMCO command to achieve an ordering of the reference frames in the reference frame list based on depth clipping plane parameter values.

In another optional embodiment, the encoder 200 comprises a value determiner 295 configured to determine a block-based value for each block of pixels in the current frame. The block-based value is representative of an average pixel value for the block. The metric calculator 260 is in this embodiment configured to calculate, for each reference frame, a near similarity metric and a far similarity metric as previously disclosed herein. The frame ordering unit 270 is configured to order the reference frames in the reference frame list based on the far similarity metrics if the block-based value is below a threshold value and otherwise order the reference frames based on the near similarity metrics.

The embodiments of an encoder 200 having units 250 to 295 to enable reordering of reference frames based on depth clipping plane parameters discussed above could be applied as specific embodiments to the predictive encoding using prediction weights calculated based on depth clipping plane parameters. In an alternative approach, these embodiments are used separately from any prediction weights calculated based on depth clipping plane parameters. In such a case, the embodiments could be applied to prior art predictive encoders using prior art prediction weights or indeed no prediction weights at all.

An aspect of these embodiments then relates to a device for ordering reference frames in a reference frame list for a depth map in the form of a frame of multiple pixels, where each pixel of the multiple pixels has a respective pixel value representing a respective distance between a camera and a respective object. The device comprises a frame identifier 250 configured to identify multiple reference frames for the frame. A metric calculator 260 is configured to calculate, for each reference frame of the multiple reference frames, a similarity metric based on at least a first depth clipping plane parameter value associated with the frame and at least a first depth clipping plane parameter value associated with the reference frame. The device further comprises a frame ordering unit 270 configured to order the multiple reference frames in a reference frame list based at least partly on the similarity metrics. Thus, the frame ordering unit 270 orders reference frames in the list based on depth clipping plane parameter values of the current frame and of the reference frames and optionally also based on the distance between the current frame and the reference frame. An optional index assigner 280 is configured to assign a respective reference frame index for at least one reference frame of the multiple reference frames in the reference frame list.

The various embodiments discussed above in connection with FIG. 22 could be applied as particular implementation examples of the aspect mentioned above. Thus, the device for ordering reference frames could optionally comprise the command generator 290 and the inserter 240 and/or the value determiner 295.

Figure 24:
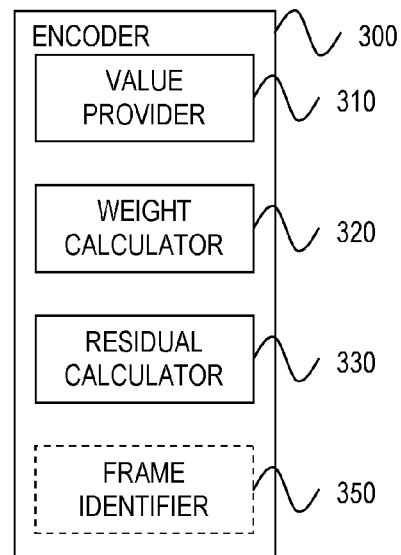
FIG. 24 is a schematic block diagram of an encoder according to a further embodiment.

FIG. 24 is a schematic block diagram of another embodiment of an encoder 300. This encoder 300 comprises the value provider 310, the weight calculator 320 and the residual calculator 330, which preferably operate as previously described in connection with FIG. 21.

The encoder 300 also comprises a frame identifier 350 configured to identify multiple candidate reference frames for the current frame, preferably as previously discussed in connection with step S70 of FIG. 13. A metric calculator 360 is configured to calculate a similarity metric for each candidate reference frame based on depth clipping plane parameter values of the current frame and of the reference frame. This unit basically operates as the metric calculator 250 of FIG. 22. The frame identifier 350 is in this embodiment also configured to identify at least one reference frame among the multiple candidate reference frames having a similarity metric that is less than a threshold value. A motion estimator 370 of the encoder 300 then performs a motion search for each block of pixels in the current frame among the at least one reference frame identified by the frame identifier 350.

The embodiments of having an encoder 300 that limits motion searches among reference frames based on depth clipping plane parameters discussed above and in connection with FIG. 24 could be applied as specific embodiments to the predictive encoder using prediction weights calculated based on depth dipping plane parameters and/or the ordering of reference frames in the reference frame list based on depth dipping plane parameters. In an alternative approach, these embodiments are used separately from any prediction weights calculation or reference frame ordering based on depth clipping plane parameters. In such a case, the embodiments could be applied to prior art predictive encoders using prior art prediction weights or indeed no prediction weights at all and prior art ordering of reference frames in the reference frame list.

An aspect of these embodiments then relates to a device for performing motion search for a depth map in the form of a frame of multiple pixels, each pixel of the multiple pixels has a respective pixel value representing a respective distance between a camera and a respective object. The device comprises a frame identifier 350 configured to identify multiple candidate reference frames for the frame. A metric calculator 360 is configured to calculate, for each candidate reference frame of the multiple candidate reference frames, a similarity metric based on at least a first depth clipping plane parameter value associated with the frame and at least a first depth dipping plane parameter value associated with the candidate reference frame. The frame identifier 350 is also configured to identify, among the multiple candidate reference frames, at least one reference frame having a similarity metric that is less than a threshold value. A motion estimator 370 of the device is configured to perform, for at least one, preferably each, block of pixels among multiple blocks of pixels in the frame, a motion search among, and preferably only among, the at least one reference frame identified by the frame identifier 350 based on the similarity metrics.

Figure 25:
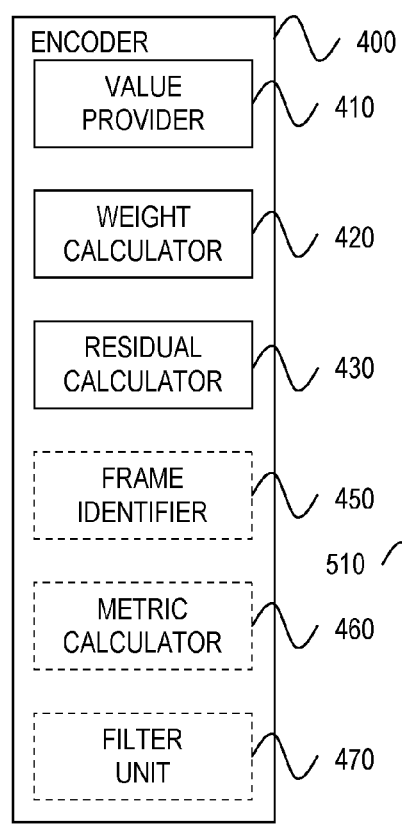
FIG. 25 is a schematic block diagram of an encoder according to still another embodiment.

FIG. 25 is a schematic block diagram of another embodiment of an encoder 400. This encoder 400 comprises the value provider 410, the weight calculator 420 and the residual calculator 430, which preferably operate as previously described in connection with FIG. 21.

The encoder 400 also comprises a frame identifier 450 configured to identify multiple reference frames for the current frame, preferably as previously discussed in connection with step S80 of FIG. 14. A metric calculator 460 is configured to calculate a similarity metric for each reference frame based on depth clipping plane parameter values of the current frame and of the reference frame. This unit basically operates as the metric calculator 250 of FIG. 22 and the metric calculator 360 of FIG. 24. The encoder 400 also comprises a filter unit 470 configured to apply a first interpolation filter or first set of interpolation filters to any reference frame identified by the frame identifier 450 for which the similarity metric calculated by the metric calculator 460 is less than a threshold value. The filter unit 470 then applies a second interpolation filter or second set of interpolation filters to any reference frame for which the similarity metric is equal to or larger than the threshold value as previously described herein.

The embodiments of selecting interpolation filter based on depth clipping plane parameters discussed above and in connection with FIG. 25 could be applied as specific embodiments to the predictive encoder using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth dipping plane parameters. In such a case, the embodiments could be applied to prior art predictive encoder using prior art prediction weights or indeed no prediction weights at all and prior art ordering of reference frames in the reference frame list.

An aspect of these embodiments then relates to a device for interpolation filtering of a depth map in the form of a frame of multiple pixels, each pixel of the multiple pixels has a respective pixel value representing a respective distance between a camera and a respective object. The device comprises a frame identifier 450 configured to identify multiple reference frames for the frame. A metric calculator 460 is configured to calculate, for each reference frame of the multiple reference frames, a similarity metric based on at least a first depth dipping plane parameter value associated with the frame and at least a first depth clipping plane parameter value associated with the reference frame. The device also comprises a filter unit 470 configured to apply a first interpolation filter or a first set of interpolation filters to any reference frame of the multiple reference frames for which the similarity metric is less than a threshold value. Correspondingly, the filter unit 470 is configured to apply a second, different interpolation filter or a second, different set of interpolation filters to any reference frame of the multiple reference frames for which the similarity metric is equal to or larger than the threshold values.

The encoders 100, 200, 300, 400 of FIGS. 21, 22, 24, 25 can be implemented in hardware, in software or a combination of hardware and software. The encoder 100, 200, 300, 400 can be implemented in a user equipment, such as a mobile telephone, tablet, desktop, notebook, multimedia player, video streaming server, set-top box or computer. The encoder 100, 200, 300, 400 may also be implemented in a network device in the form of or connected to a network node, such as radio base station, in a communication network or system. The encoder 100, 200, 300, 400 is advantageously implemented as a part of an device for encoding multi-view video content.

Although the respective units 110-140, 210-295, 310-370, 410-470 disclosed in conjunction with FIGS. 21-25 have been disclosed as physically separate units 110-140, 210-295, 310-370, 410-470 in the encoder 100, 200, 300, 400, and all may be special purpose circuits, such as ASICs (Application Specific Integrated Circuits), alternative embodiments of the encoder 100, 200, 300, 400 are possible where some or all of the units 110-140, 210-295, 310-370, 410-470 are implemented as computer program modules running on a general purpose processor. Such an embodiment is disclosed in FIG. 26.

Figure 26:
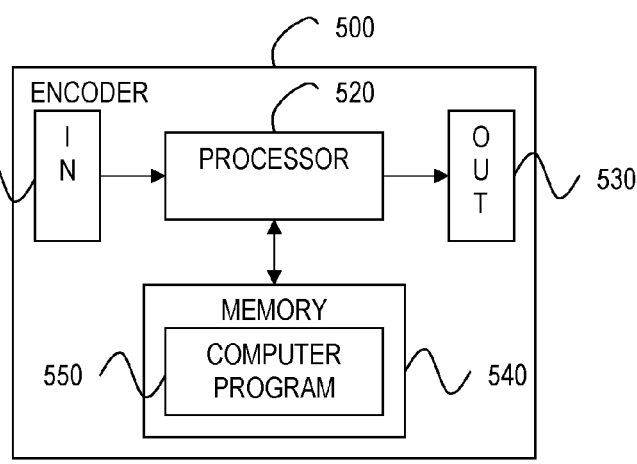
FIG. 26 is a schematic block diagram of an encoder according to an embodiment implemented at least partly in software.

FIG. 26 schematically illustrates an embodiment of an encoder 500 or computer having a processing unit or processor 520, such as a DSP (Digital Signal Processor) or CPU (Central Processing Unit). The processor 520 can be a single unit or a plurality of units for performing different steps of the methods described herein. The encoder 500 also comprises an input section 510 for receiving a depth map in the form of a frame of multiple pixels with respective pixel values representing distances between a camera and a respective object. An output section 530 of the encoder is configured to output encoded representations of depth maps. The input section 510 and the output section 530 have been illustrated in the form of separate unit but can likewise be in the form of a single input/output (I/O) unit in FIG. 26.

Furthermore, the encoder 500 comprises at least one computer program product in the form of a non-volatile memory 540, for instance an EEPROM (Electrically Erasable Programmable Read-Only Memory), a flash memory or a disk drive. The computer program product comprises a computer program 550 which comprises code means which when run on or executed by or on the encoder 500, such as by the processor 520, causes the processor 520 to perform the steps of the method described in the foregoing in connection with FIG. 6. Hence, in an optional embodiment the code means in the computer program 550 comprises a value providing module or value provider 110, 210, 320, 410 providing depth clipping plane parameter values, a weight calculating module or weight calculator 120, 220, 320, 420 calculating prediction weights and a residual calculating module or residual calculator 130, 230, 330, 430 calculating prediction residuals. These modules essentially perform the steps of the flow diagram in FIG. 6 when run on the process or 520. Thus, when the different modules are run on the processor 520 they correspond to the corresponding units of FIGS. 21, 22, 24, 25.

The computer program 550 may additionally comprise modules corresponding to the other units disclosed in FIGS. 21-25.

Figure 27:
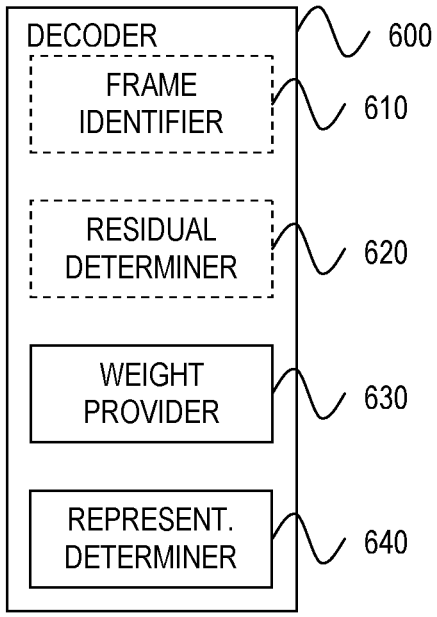
FIG. 27 is a schematic block diagram of a decoder according to an embodiment.

FIG. 27 is a schematic block diagram of a decoder 600 for predictive decoding of an encoded representation of a depth map in the form of a frame of multiple pixels. The decoder 600 comprises an optional frame identifier 610 configured to identify a reference frame among multiple reference frames based on the encoded representation of the depth map. The frame identifier 610 preferably identifies the reference frame from a reference frame list using a reference frame index obtained based on the encoded representation of the depth map as previously discussed herein in connection with step S90 of FIG. 15.

An optional residual determiner 620 of the decoder 600 is configured to determine a prediction residual for the current frame based on the encoded representation of the depth map as discussed in connection with step S91 of FIG. 15.

The decoder 600 comprises a weight provider 630 configured to provide a prediction weight based on the encoded representation of the depth map. This prediction weight is calculated based on at least a first depth dipping plane parameter value associated with the current frame and at least a first depth clipping plane parameter value associated with the reference frame identified by the frame identifier 610.

A representation determiner 640 is configured to determine a decoded representation of the current frame based on the prediction residual determined by the residual determiner 620 and at least one pixel value of the reference frame, identified by the frame identifier 610, weighted by the prediction weight provided by the weight provider 630. The at least one pixel value that is weighted by the prediction weight is preferably identified using a motion vector determined based on the encoded representation of the depth map.

In an embodiment, the weight provider 630 is configured to retrieve an encoded representation of the prediction weight from the encoded representation of the depth map. The weight provider 630 thereby determined the prediction weight to be used for the reference frame based on the retrieved encoded representation of the prediction weight.

Figure 28:
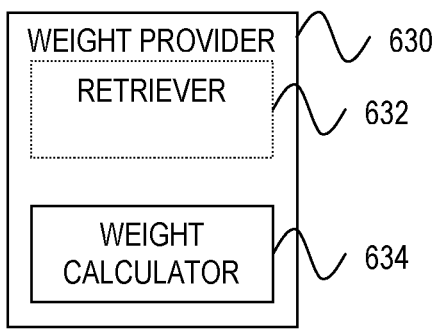
FIG. 28 is a schematic block diagram of an embodiment of the weight provider in FIG. 27.

FIG. 28 is a schematic block diagram of another embodiment of the weight provider 630. In this embodiment the weight provider 630 comprises an optional retriever 632 configured to retrieve encoded representations of the depth clipping plane parameter values of the current frame and of the reference frame from the encoded representation of the depth map. A weight calculator 634 then calculates the prediction weight based on the decoded depth clipping plane parameter values determined based on the data retrieved by the retriever 632.

The weight calculator 634 that is implemented in the decoder 600 basically operates similar to the counterpart implemented in the encoder. Hence, the discussion with the encoder 120, 220, 320, 420 in FIGS. 21, 22, 24, 25 also apply to the weight calculator 634 of FIG. 28. This means that the weight calculator 634 could calculate the prediction weight according to any of equations 2 to 9. For instance, the weight calculator 634 could calculate a respective prediction weight according to equation 2 for each pixel of at least a block of pixels in the reference frame. The weight calculator 634 additionally calculates the prediction weight, for the block of pixels, based on average of these respective prediction weights.

Alternatively, the weight calculator 634 calculates a single prediction weight for the pair of the current frame and the reference frames. For instance, the single prediction weight could be calculated based on equation 2 and an average depth value for the reference frame.

In a further alternative, the weight calculator 634 calculates a prediction weight for a block of pixels in the reference frame based on the depth clipping plane parameter values of the current frame and of the reference frame and based on at least one pixel value representative of the block of pixels. For instance, the prediction weight could be calculated based on equation 2 and using an average depth value for the block of pixels.

Figure 29:
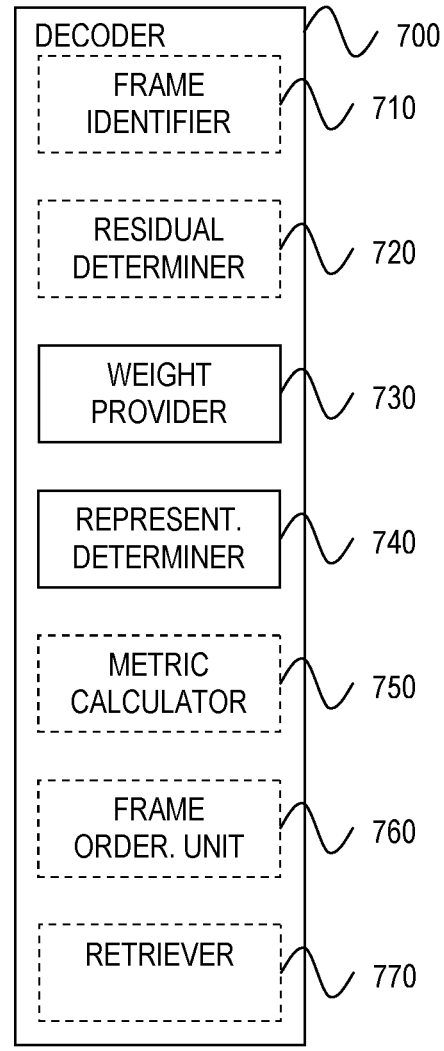
FIG. 29 is a schematic block diagram of a decoder according to another embodiment.

FIG. 29 is a schematic block diagram of another embodiment of a decoder 700. This decoder 700 comprises the frame identifier 710, the residual determiner 720, the weight provider 730 and the representation determiner 740, which preferably operate as previously described in connection with FIG. 27.

The decoder 700 preferably also comprises a metric calculator 750 configured to calculate a similarity metric for each reference frame in a reference frame list based on depth clipping plane parameter values. This metric calculator 750 preferably operates in a same way as the metric calculator 260 implemented at the encoder side in FIG. 22. The decoder 700 also comprises a frame ordering unit 760 configured to order the multiple reference frames in the reference frame list based on the similarity metrics calculated by the metric calculator 750. The frame identifier 710 is then configured to identify the reference frame from the reference frame list based on a reference frame index obtained based on the encoded representation of the depth map.

The frame ordering unit 760 in FIG. 29 basically operates in the same way as the frame ordering unit 270 of FIG. 22.

The metric calculator 750 is preferably configured to calculate the similarity metric as an absolute difference between the near or far depth clipping plane parameter value associated with the current frame and the near or far depth clipping plane parameter value associated with the reference frame.

Figure 30:
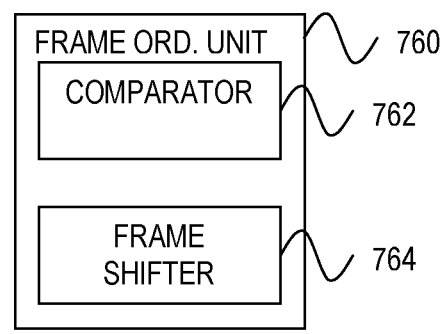
FIG. 30 is a schematic block diagram of an embodiment of the frame ordering unit in FIG. 29.

FIG. 30 is a schematic block diagram of an embodiment of the frame ordering unit 760. In this embodiment the frame ordering unit 760 comprises a comparator 762 configured to compare similarity metrics with a threshold value. This comparator 762 operates similar to the comparator 272 of FIG. 23. A frame shifter 764 is configured to shift a position of the reference step at least one position towards the front of the reference frame list from a preliminary order defined based on respective distances of the multiple reference frames to the current frame. The frame shifter 764 performs such a position shift if the similarity metric is smaller than the threshold value. The frame shifter 764 operates similar to the frame shifter 274 of FIG. 23.

In an embodiment the decoder 700 of FIG. 29 comprises a retriever 770 configured to retrieve a block-based value for a block of pixels in the current frame from the encoded representation of the depth map. The block-based value is representative of an average pixel value for the block of pixels.

The metric calculator 750 is then configured to calculate a respective near and a respective far similarity metric for each reference frame as previously disclosed herein. In such a case, the frame ordering unit 760 performs the ordering of the reference frames in the reference frame list based on the far similarity metrics if the block-based value is below a threshold value and otherwise, i.e. the block-based value is equal to or exceeds the threshold value, the frame order unit 760 instead uses the near similarity metrics when ordering the reference frames.

The embodiments of reordering reference frames based on depth clipping plane parameters discussed above and in connection with FIGS. 29 and 30 could be applied as specific embodiments to the predictive decoder using prediction weights calculated based on depth clipping plane parameters. In an alternative approach, these embodiments are used separately from any prediction weights calculated based on depth clipping plane parameters. In such a case, the embodiments could be applied to prior art predictive decoders using prior art prediction weights or indeed no prediction weights at all.

An aspect of these embodiments then relates to a device for ordering reference frames in a reference frame list for a depth map in the form of a frame of multiple pixels, where each pixel of the multiple pixels has a respective pixel value representing a respective distance between a camera and a respective object. The device comprises an optional frame identifier 710 configured to identify multiple reference frames for the frame. A metric calculator 750 is configured to calculate, for each reference frame of the multiple reference frames, a similarity metric based on at least a first depth clipping plane parameter value associated with the frame and at least a first depth clipping plane parameter value associated with the reference frame. The device further comprises a frame ordering unit 760 configured to order the multiple reference frames in a reference frame list based at least partly on the similarity metrics. The optional frame identifier 710 is also configured to identify a reference frame from the reference frame list following the frame ordering unit 760 ordering the reference frames and based on a reference frame index obtained based on an encoded representation of the depth map.

The various embodiments discussed above in connection with FIGS. 29 and 30 could be applied as particular implementation examples of the aspect mentioned above.

Figure 31:
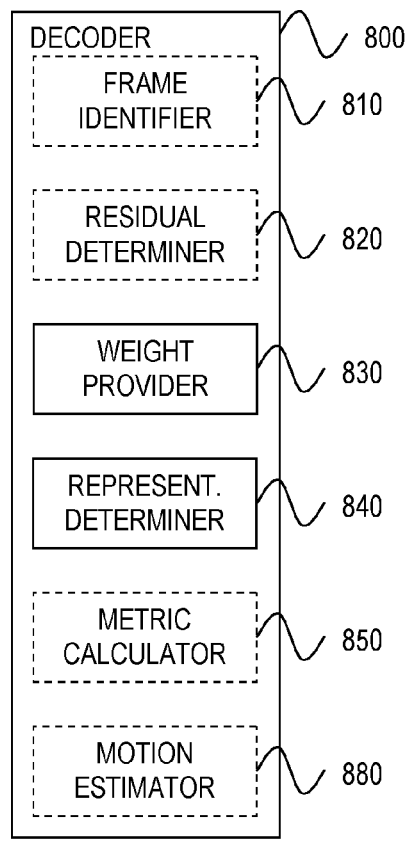
FIG. 31 is a schematic block diagram of a decoder according to a further embodiment.

FIG. 31 is a schematic block diagram of another embodiment of a decoder 800. This decoder 800 comprises the frame identifier 810, the residual determiner 820, the weight provider 830 and the representation determiner 840, which preferably operate as previously described in connection with FIG. 27.

The decoder 800 also comprises a metric calculator 850 configured to calculate a similarity metric for each candidate frame of multiple candidate frames. The similarity metric is calculated based on depth clipping plane parameter values associated with the current frame and the candidate reference frame, respectively. The operation of the metric calculator 850 is similar to the operation of the corresponding metric calculator 360 in FIG. 24.

The frame identifier 810 is in this embodiment configured to identify at least one reference frame among the multiple candidate reference frames. This at least one identified reference frame has a similarity metric that is less than a threshold value, and thereby a depth dipping plane parameter value that is equal to or at least close to the depth dipping plane parameter value of the current frame.

A motion estimator 880 is implemented in the decoder 800 to perform motion search for each block of pixels among multiple such blocks of pixels in the current frame among the at least one reference frame identified by the frame identifier 810. Hence, the motion search is restricted to those reference frames that have depth dipping plane parameter values that differ less than the threshold value from the depth clipping plane parameter value of the current frame. The operation of this motion estimator is basically the same as the motion estimator 370 in FIG. 24.

The embodiments of limiting motion searches among reference frames based on depth dipping plane parameters could be applied as specific embodiments to the predictive decoder using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth clipping plane parameters. In such a case, the embodiments could be applied to prior art predictive decoders using prior art prediction weights or indeed no prediction weights at all and prior art ordering of reference frames in the reference frame list.

Figure 32:
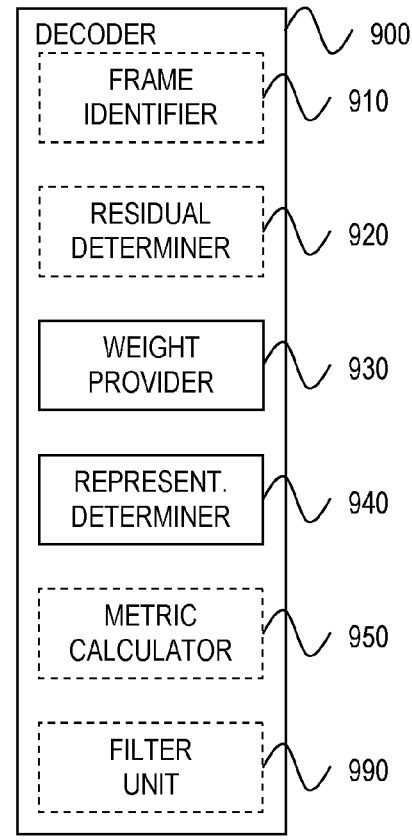
FIG. 32 is a schematic block diagram of a decoder according to still another embodiment.

FIG. 32 is a schematic block diagram of another embodiment of a decoder 900. This decoder 900 comprises the frame identifier 910, the residual determiner 920, the weight provider 930 and the representation determiner 940, which preferably operate as previously described in connection with FIG. 27.

The decoder 900 also comprises a metric calculator 950 configured to calculate a respective similarity metric for each reference frame of multiple reference frames based on depth dipping plane parameters of the current frame and of the reference frame. The operation of the metric calculator 950 is basically the same as of the metric calculator 460 in FIG. 25.

A filter unit 990 is implemented in the decoder 900 to apply either a first interpolation filter or filter set or a second interpolation filter or filter set to a reference frame based on the value of the similarity metric calculated for the reference frame. Thus, reference frames having a similarity metric that is less than the threshold value will use the first interpolation filter (set), whereas reference frames with a similarity metric equal to or exceeding the threshold value will instead use the second interpolation filter (set). The operation of the filter unit 990 is basically the same as of the filter unit 470 in FIG. 25.

The embodiments of selecting interpolation filter based on depth dipping plane parameters discussed above and in connection with FIG. 32 could be applied as specific embodiments to the predictive decoder using prediction weights calculated based on depth clipping plane parameters and/or the ordering of reference frames in the reference frame list based on depth clipping plane parameters. In an alternative approach, these embodiments are used separately from any prediction weights calculation or reference frame ordering based on depth clipping plane parameters. In such a case, the embodiments could be applied to prior art predictive decoders using prior art prediction weights or indeed no prediction weights at all and prior art ordering of reference frames in the reference frame list.

The decoders 600, 700, 800, 900 of FIGS. 27, 29, 31, 232 can be implemented in hardware, in software or a combination of hardware and software. The decoders 600, 700, 800, 900 can be implemented in a user equipment, such as a mobile telephone, tablet, desktop, notebook, multimedia player, video streaming server, set-top box or computer. The decoder 600, 700, 800, 900 is advantageously implemented as a part of a device for decoding multi-view video content.

Although the respective units 610-640, 710-770, 810-880, 910-990 disclosed in conjunction with FIGS. 27-32 have been disclosed as physically separate units 610-640, 710-770, 810-880, 910-990 in the decoder 600, 700, 800, 900, and all may be special purpose circuits, such as ASICs (Application Specific Integrated Circuits), alternative embodiments of the decoder 600, 700, 800, 900 are possible where some or all of the units 610-640, 710-770, 810-880, 910-990 are implemented as computer program modules running on a general purpose processor. Such an embodiment is disclosed in FIG. 33.

Figure 33:
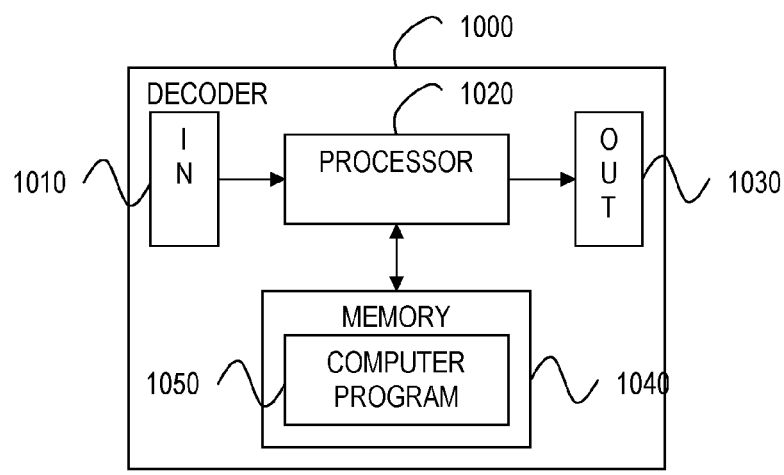
FIG. 33 is a schematic block diagram of a decoder according to an embodiment implemented at least partly in software.

FIG. 33 schematically illustrates an embodiment of a decoder 1000 or computer having a processing unit or processor 1020, such as a DSP (Digital Signal Processor) or CPU (Central Processing Unit). The processor 1020 can be a single unit or a plurality of units for performing different steps of the methods described herein. The decoder 1000 also comprises an input section 1010 for receiving an encoded representation of a depth map in the form of a frame of multiple pixels with respective pixel values representing distances between a camera and a respective object. An output section 1030 of the decoder 1000 is configured to output decoded representations of depth maps. The input section 1010 and the output section 1030 have been illustrated in the form of separate unit but can likewise be in the form of a single input/output (I/O) unit in FIG. 33.

Furthermore, the decoder 1000 comprises at least one computer program product in the form of a non-volatile memory 1040, for instance an EEPROM (Electrically Erasable Programmable Read-Only Memory), a flash memory or a disk drive. The computer program product comprises a computer program 1050 which comprises code means which when run on or executed by or on the decoder 1000, such as by the processor 1020, causes the processor 1020 to perform the steps of the method described in the foregoing in connection with FIG. 15. Hence, in an optional embodiment the code means in the computer program 1050 comprises a value identifying module or frame identifier 610, 710, 810, 910 identifying a reference frame, a residual determining module or residual determiner 620, 720, 820, 920 determining a prediction residual, a weight providing module or weight provider 630, 730, 830, 930 providing a prediction weight and a representation determining module or representation determiner 640, 740, 840, 940 determining a decoded representation of a frame/depth map. These modules essentially perform the steps of the flow diagram in FIG. 15 when run on the process or 1020. Thus, when the different modules are run on the processor 1020 they correspond to the corresponding units of FIGS. 27, 29, 31, 32.

The computer program 1050 may additionally comprise modules corresponding to the other units disclosed in FIGS. 27-32.

Although specific embodiments have been discussed, one of ordinary skill in the art will appreciate that the described solutions may be implemented in any appropriate type of communication system supporting any suitable communication standards and using any suitable components. This includes any combination of software and/or hardware, such as memory and processor(s), that may be used to provide some or all of the functionality identified above and/or any functionality necessary to support the solutions described above.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of predictive encoding of a depth map in the form of a frame of multiple pixels, each pixel of said multiple pixels having a respective pixel value representing a respective distance between a camera and a respective object, said method comprising:

providing at least a first depth clipping plane parameter value associated with said frame and at least a first depth clipping plane parameter value associated with a reference frame, wherein providing said at least a first depth clipping plane parameter comprises providing a near depth clipping plane parameter value and a far depth clipping plane parameter value associated with said frame and a near depth clipping plane parameter and a far depth clipping plane parameter value associated with said reference frame;

calculating a prediction weight based on said at least a first depth clipping plane parameter value associated with said frame and said at least a first depth clipping plane parameter value associated with said reference frame, wherein calculating said prediction weight comprises calculating said prediction weight as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}},$$

wherein $Z_{near,1}$ represents said near depth clipping plane parameter value associated with said frame, $Z_{far,1}$ represents said far depth clipping plane parameter value associated with said frame, $Z_{near,0}$ represents said near depth clipping plane parameter value associated with said reference frame, $Z_{far,0}$ represents said far depth clipping plane parameter value associated with said reference frame, and Z represents a depth value of a pixel in said reference frame; and calculating a prediction residual for said frame based on at least one pixel value of said frame and at least one pixel value of said reference frame weighted by said prediction weight, wherein an encoded representation of said depth map comprises an encoded representation of said prediction residual.

2. The method of claim 1, wherein calculating said prediction weight comprises calculating a single prediction weight for the pair of said frame and said reference frame based on said at least a first depth clipping plane parameter value associated with said frame and said at least a first depth clipping plane parameter value associated with said reference frame.

3. The method of claim 1, wherein said reference frame comprises multiple blocks of pixels and calculating said prediction weight comprises calculating, for a block of said multiple blocks, a single prediction weight based on said at least a first depth clipping plane parameter value associated with said frame, said at least a first depth clipping plane parameter value associated with said reference frame, and at least one pixel value representative of said block.

4. The method of claim 1, further comprising inserting an encoded representation of said prediction weight into said encoded representation of said depth map.

5. The method of claim 1, further comprising:
identifying multiple reference frames;
calculating, for each reference frame of said multiple reference frames, a similarity metric based on said at least a first depth clipping plane parameter value associated with said frame and at least a first depth clipping plane parameter value associated with said reference frame;
ordering said multiple reference frames in a reference frame list based on said similarity metrics; and
assigning a respective reference frame index to at least one reference frame of said multiple reference frames in said reference frame list, wherein said encoded representation of said depth map comprises an encoded representation of said at least one reference frame index.

6. The method of claim 5, further comprising:
generating, based on said similarity metrics, a memory management control operation command indicating said ordering of said multiple reference frames in said reference frame list; and
inserting said memory management control operation command into said encoded representation of said depth map.

7. The method of claim 1, further comprising:
identifying multiple candidate reference frames;
calculating, for each candidate reference frame of said multiple candidate reference frames, a similarity metric based on said at least a first depth clipping plane parameter value associated with said frame and at least a first depth clipping plane parameter value associated with said candidate reference frame;
identifying, among said multiple candidate reference frames, at least one reference frame having a similarity metric that is less than a threshold value; and
performing, for each block of pixels among multiple blocks of pixels in said frame, a motion search among said at least one reference frame.

8. The method of claim 1, further comprising:
identifying multiple reference frames;
calculating, for each reference frame of said multiple reference frames, a similarity metric based on said at least a first depth clipping plane parameter value associated with said frame and at least a first depth clipping plane parameter value associated with said reference frame;
applying a first interpolation filter to any reference frame of said multiple reference frames for which said similarity metric is less than a threshold value; and
applying a second interpolation filter to any reference frame of said multiple reference frames for which said similarity metric is equal to or larger than said threshold value.

9. A method of predictive decoding of an encoded representation of a depth map in the form of a frame of multiple pixels, each pixel of said multiple pixels having a respective pixel value representing a respective distance between a camera and a respective object, the method comprising:
providing, based on said encoded representation of said depth map, a prediction weight calculated based on at least a first depth clipping plane parameter value associated with said frame and at least a first depth clipping plane parameter value associated with a reference frame, wherein providing said prediction weight comprises:
retrieving encoded representations of said at least a first depth clipping plane parameter value associated with said frame and of said at least a first depth clipping plane parameter value associated with said reference frame from said encoded representation of said depth map, and wherein retrieving said encoded representations comprises retrieving encoded representations of a near depth clipping plane parameter value and a far depth clipping plane parameter value associated with said frame and of a near depth clipping plane parameter and a far depth clipping plane parameter value associated with said reference frame; and
calculating said prediction weight based on said at least a first depth clipping plane parameter value associated with said frame and said at least a first depth clipping plane parameter value associated with said reference frame, and wherein calculating said prediction weight comprises calculating said prediction weight based on said near depth clipping plane parameter value and said far depth clipping plane parameter value associated with said frame and said near depth clipping plane parameter and said far depth clipping plane parameter value associated with said reference frame, and wherein calculating said prediction weight further comprises calculating said prediction weight as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}},$$

wherein $Z_{near,1}$ represents said near depth clipping plane parameter value associated with said frame, $Z_{far,1}$ represents said far depth clipping plane parameter value associated with said frame, $Z_{near,0}$ represents said near depth clipping plane parameter value associated with said reference frame, $Z_{far,0}$ represents said far depth clipping plane parameter value associated with said reference frame and Z represents a depth value of a pixel in said reference frame; and
  determining a decoded representation of said depth map based on a prediction residual for said frame and at least one pixel value of said reference frame weighted by said prediction weight.

10. The method of claim 9, further comprising:
identifying said reference frame among multiple reference frames based on said encoded representation of said depth map; and
determining said prediction residual for said frame based on said encoded representation of said depth map.

11. The method of claim 10, further comprising:
calculating, for each reference frame of multiple reference frames in a reference frame list, a similarity metric based on said at least a first depth clipping plane parameter value associated with said frame and at least a first depth clipping plane parameter value associated with said reference frame; and
  ordering said multiple reference frames in said reference frame list based on said similarity metrics, wherein identifying said reference frame comprises identifying said reference frame from said reference frame list based on a reference frame index provided based on said encoded representation of said depth map.

12. The method of claim 9, wherein providing said prediction weight comprises retrieving an encoded representation of said prediction weight from said encoded representation of said depth map.

13. The method of claim 9, wherein calculating said prediction weight comprises calculating a single prediction weight for the pair of said frame and said reference frame based on said at least a first depth clipping plane parameter value associated with said frame and said at least a first depth clipping plane parameter value associated with said reference frame.

14. The method of claim 9, wherein said reference frame comprises multiple blocks of pixels and calculating said prediction weight comprises calculating, for a block of said multiple blocks, a single prediction weight based on said at least a first depth clipping plane parameter value associated with said frame, said at least a first depth clipping plane parameter value associated with said reference frame and at least one pixel value representative of said block.

15. The method of claim 9, further comprising:
calculating, for each candidate reference frame of multiple candidate reference frames, a similarity metric based on said at least a first depth clipping plane parameter value associated with said frame and at least a first depth clipping plane parameter value associated with said candidate reference frame;
identifying, among said multiple candidate reference frames, at least one reference frame having a similarity metric that is less than a threshold value; and
performing, for each block of pixels among multiple blocks of pixels in said frame, a motion search among said at least one reference frame.

16. The method of claim 9, further comprising:
calculating, for each reference frame of multiple reference frames, a similarity metric based on said at least a first depth clipping plane parameter value associated with said frame and at least a first depth clipping plane parameter value associated with said reference frame;
applying a first interpolation filter to any reference frame of said multiple reference frames for which said similarity metric is less than a threshold value; and
applying a second interpolation filter to any reference frame of said multiple reference frames for which said similarity metric is equal to or larger than said threshold value.

17. A method of predictive decoding of an encoded representation of a depth may in the form of a frame of multiple pixels, each pixel of said multiple pixels having a respective pixel value representing a respective distance between a camera and a respective object, the method comprising:
providing, based on said encoded representation of said depth map, a prediction weight calculated based on at least a first depth clipping plane parameter value associated with said frame and at least a first depth clipping plane parameter value associated with a reference frame, wherein said reference frame is identified from among multiple reference frames based on said encoded representation of said depth map;
calculating, for each reference frame of multiple reference frames in a reference frame list, a similarity metric based on said at least a first depth clipping plane parameter value associated with said frame and at least a first depth clipping plane parameter value associated with said reference frame, wherein calculating said similarity metric comprises calculating, for each reference frame of said multiple reference frames, said similarity metric as an absolute difference between said at least a first depth clipping plane parameter value associated with said frame and said at least a first depth clipping plane parameter value associated with said reference frame;
ordering said multiple reference frames in said reference frame list based on said similarity metrics, wherein identifying said reference frame comprises identifying said reference frame from said reference frame list based on a reference frame index provided based on said encoded representation of said depth map, wherein ordering said multiple reference frames comprises, for each reference frame of said multiple reference frames;
  comparing said similarity metric with a threshold value; and
  shifting, if said similarity metric is smaller than said threshold value, a position of said reference frame at least one position towards a front of said reference frame list in relation to a preliminary order list in which said multiple reference frames are ordered based on their respective distance to said frame; and
determining a decoded representation of said depth map based on a prediction residual for said frame and at least one pixel value of said reference frame weighted by said prediction weight, wherein said prediction residual is determined for said frame based on said encoded representation of said depth map.

18. A method of predictive decoding of an encoded representation of a depth may in the form of a frame of multiple pixels, each pixel of said multiple pixels having a respective pixel value representing a respective distance between a camera and a respective object, the method comprising:
providing, based on said encoded representation of said depth map, a prediction weight calculated based on at least a first depth clipping plane parameter value associated with said frame and at least a first depth clipping plane parameter value associated with a reference frame, wherein said reference frame is identified from among multiple reference frames based on said encoded representation of said depth map;
calculating, for each reference frame of multiple reference frames in a reference frame list, a similarity metric based on said at least a first depth clipping plane parameter value associated with said frame and at least a first depth clipping plane parameter value associated with said reference frame, wherein said frame comprises multiple blocks of pixels, said frame is associated with a near depth clipping plane parameter value and a far depth clipping plane parameter value and each reference frame of said multiple reference frames is associated with a respective near depth clipping plane parameter value and a respective far depth clipping plane parameter value, said method further comprising retrieving, for each block of said multiple blocks, a block-based value representative of an average pixel value for said block from said encoded representation of said depth map, and wherein calculating said similarity metric comprises:
calculating, for each reference frame of said multiple reference frames, a near similarity metric based on said near depth clipping plane parameter value associated with said frame and a near depth clipping plane parameter value associated with said reference frame; and
calculating, for each reference frame of said multiple reference frames, a far similarity metric based on said far depth clipping plane parameter value associated with said frame and a far depth clipping plane parameter value associated with said reference frame;
ordering said multiple reference frames in said reference frame list based on said similarity metrics, wherein identifying said reference frame comprises identifying said reference frame from said reference frame list based on a reference frame index provided based on said encoded representation of said depth map, wherein ordering said multiple reference frames comprises, for each block of said multiple blocks:
ordering, if said block-based value is equal to or exceeds a threshold value, said multiple reference frames in said reference frame list based on said near similarity metrics; and
ordering, if said block-based value is below said threshold value, said multiple reference frames in said reference frame list based on said far similarity metrics; and
determining a decoded representation of said depth map based on a prediction residual for said frame and at least one pixel value of said reference frame weighted by said prediction weight, wherein said prediction residual is determined for said frame based on said encoded representation of said depth map.

19. An encoder for predictive encoding of a depth map in the form of a frame of multiple pixels, each pixel of said multiple pixels having a respective pixel value representing a respective distance between a camera and a respective object, said encoder comprising:
a value provider configured to provide at least a first depth clipping plane parameter value associated with said frame and at least a first depth clipping plane parameter value associated with a reference frame, wherein said value provider is configured to provide a near depth clipping plane parameter value and a far depth clipping plane parameter value associated with said frame and a near depth clipping plane parameter and a far depth clipping plane parameter value associated with said reference frame;
a weight calculator configured to calculate a prediction weight based on said at least a first depth clipping plane parameter value associated with said frame and said at least a first depth clipping plane parameter value associated with said reference frame, wherein said weight calculator is configured to calculate said prediction weight based on said near depth clipping plane parameter value and said far depth clipping plane parameter value associated with said frame and said near depth clipping plane parameter and said far depth clipping plane parameter value associated with said reference frame, and wherein said wherein said weight calculator is configured to calculate said prediction weight as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}},$$

wherein $Z_{near,1}$ represents said near depth clipping plane parameter value associated with said frame, $Z_{far,1}$ represents said far depth clipping plane parameter value associated with said frame, $Z_{near,0}$ represents said near depth clipping plane parameter value associated with said reference frame, $Z_{far,0}$ represents said far depth clipping plane parameter value associated with said reference frame and Z represents a depth value of a pixel in said reference frame; and
a residual calculator configured to calculate a prediction residual for said frame based on at least one pixel value of said frame and at least one pixel value of said reference frame weighted by said prediction weight, wherein an encoded representation of said depth map comprises an encoded representation of said prediction residual.

20. The encoder of claim 19, wherein said reference frame comprises multiple blocks of pixels and said weight calculator is configured to calculate, for a block of said multiple blocks, a single prediction weight based on said at least a first depth clipping plane parameter value associated with said frame, said at least a first depth clipping plane parameter value associated with said reference frame and at least one pixel value representative of said block.

21. The encoder of claim 19, further comprising an inserter configured to insert an encoded representation of said prediction weight into said encoded representation of said depth map.

22. A decoder for predictive decoding of an encoded representation of a depth map in the form of a frame of multiple pixels, each pixel of said multiple pixels having a respective pixel value representing a respective distance between a camera and a respective object, said decoder comprising:

a retriever configured to retrieve encoded representations of at least a first depth clipping plane parameter value associated with said frame and at least a first depth clipping plane parameter value associated with a reference frame from said encoded representation of said depth map, wherein said retriever is configured to retrieve encoded representations of a near depth clipping plane parameter value and a far depth clipping plane parameter value associated with said frame and a near depth clipping plane parameter and a far depth clipping plane parameter value associated with said reference frame;

a weight provider configured to provide, based on said encoded representation of said depth map, a prediction weight calculated based on said at least a first depth clipping plane parameter value associated with said frame and said at least a first depth clipping plane parameter value associated with said reference frame;

a weight calculator configured to calculate said prediction weight based on said at least a first depth clipping plane parameter value associated with said frame and said at least a first depth clipping plane parameter value associated with said reference frame, wherein said weight calculator is configured to calculate said prediction weight based on said near depth clipping plane parameter value and said far depth clipping plane parameter value associated with said frame and said near depth clipping plane parameter and said far depth clipping plane parameter value associated with said reference frame, and wherein said weight calculator is configured to calculate said prediction weight as $$\frac{Z^{-1} - Z_{far,1}^{-1}}{Z^{-1} - Z_{far,0}^{-1}} \frac{Z_{near,0}^{-1} - Z_{far,0}^{-1}}{Z_{near,1}^{-1} - Z_{far,1}^{-1}},$$

wherein $Z_{near,1}$ represents said near depth clipping plane parameter value associated with said frame, $Z_{far,1}$ represents said far depth clipping plane parameter value associated with said frame, $Z_{near,0}$ represents said near depth clipping plane parameter value associated with said reference frame, $Z_{far,0}$ represents said far depth clipping plane parameter value associated with said reference frame and Z represents a depth value of a pixel in said reference frame; and a representation determiner configured to determine a decoded representation of said depth map based on a prediction residual for said frame and at least one pixel value of said reference frame weighted by said prediction weight.

23. The decoder of claim 22, further comprising:
a frame identifier configured to identify said reference frame among multiple reference frames based on said encoded representation of said depth map; and
a residual determiner configured to determine said prediction residual for said frame based on said encoded representation of said depth map.

24. The decoder of claim 22, wherein said weight provider is configured to retrieve an encoded representation of said prediction weight from said encoded representation of said depth map.

25. The decoder of claim 22, wherein said reference frame comprises multiple blocks of pixels and said weight calculator is configured to calculate, for a block of said multiple blocks, a single prediction weight based on said at least a first depth clipping plane parameter value associated with said frame, said at least a first depth clipping plane parameter value associated with said reference frame, and at least one pixel value representative of said block.

* * * * *